US009500858B2

(12) United States Patent
Ohi et al.

(10) Patent No.: US 9,500,858 B2
(45) Date of Patent: Nov. 22, 2016

(54) IMAGE RECORDING SYSTEM AND IMAGE RECORDING METHOD

(71) Applicants: Katsuya Ohi, Shizuoka (JP); Toshiaki Asai, Shizuoka (JP); Kazutaka Yamamoto, Kanagawa (JP); Tomomi Ishimi, Shizuoka (JP)

(72) Inventors: Katsuya Ohi, Shizuoka (JP); Toshiaki Asai, Shizuoka (JP); Kazutaka Yamamoto, Kanagawa (JP); Tomomi Ishimi, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 22 days.

(21) Appl. No.: 14/098,738

(22) Filed: Dec. 6, 2013

(65) Prior Publication Data

US 2014/0158771 A1     Jun. 12, 2014

(30) Foreign Application Priority Data

Dec. 10, 2012   (JP) .................................. 2012-269074
Oct. 17, 2013   (JP) .................................. 2013-215912

(51) Int. Cl.
| | | |
|---|---|---|
| *G02B 5/00* | (2006.01) | |
| *G02B 26/10* | (2006.01) | |
| *B41J 2/475* | (2006.01) | |

(52) U.S. Cl.
CPC .............. *G02B 26/10* (2013.01); *B41J 2/4753* (2013.01); *B41J 2002/4756* (2013.01)

(58) Field of Classification Search
USPC .................................................. 235/462.32
See application file for complete search history.

(56) References Cited

U.S. PATENT DOCUMENTS

| 8,227,379 B2 * | 7/2012 | Okada ...................... B41M 5/41 |
| | | 503/200 |
| 2008/0192618 A1 * | 8/2008 | Nakata ...................... B41J 2/32 |
| | | 369/120 |
| 2010/0289866 A1 | 11/2010 | Hasegawa |
| 2012/0013701 A1 | 1/2012 | Ishimi et al. |
| 2012/0162340 A1 | 6/2012 | Furukawa et al. |

FOREIGN PATENT DOCUMENTS

| CN | 102407682 | 11/2012 |
| JP | 06-155858 | 6/1994 |
| JP | 11-151856 | 6/1999 |
| JP | 2000-136022 | 5/2000 |
| JP | 2008-194905 | 8/2008 |
| JP | 2009-226945 | 10/2009 |
| JP | 4426124 | 12/2009 |
| JP | 2011-104991 | 6/2011 |
| JP | 4845556 | 10/2011 |
| JP | 2012-135891 | 7/2012 |

* cited by examiner

*Primary Examiner* — Michael G Lee
*Assistant Examiner* — Tabitha Chedekel
(74) *Attorney, Agent, or Firm* — Cooper & Dunham LLP

(57) ABSTRACT

Provided is an image recording system for recording an image on a thermally reversible recording medium held by a conveyed article conveyed on a predetermined conveying path in a predetermined conveying direction, including: a recording device provided on at least one side of the conveying path in a direction perpendicular to the conveying direction and configured to record an image on the thermally reversible recording medium of the conveyed article conveyed to a position facing the recording device by heating the thermally reversible recording medium. The image includes a scan image to be read by a reading device when the conveyed article is conveyed downstream in the conveying direction from the position facing the recording device. The recording device records the scan image on the thermally reversible recording medium within a former half of a recording time of the image.

14 Claims, 16 Drawing Sheets

IMAGE RECORDING SYSTEM AND IMAGE RECORDING METHOD

BACKGROUND OF THE INVENTION

1. Field of the Invention

The present invention relates to an image recording system and an image recording method, and particularly to an image recording system and an image recording method for recording an image on a thermally reversibly recording medium held by a conveyed article.

2. Description of the Related Art

Conventionally, a technique is known which conveys a conveyed article holding a thermally reversible recording medium to a predetermined position on the conveying path, and records an image including a scan image (e.g., a barcode) on the thermally reversible recording medium by heating it (see, e.g., Japanese Patent Application Laid-Open (JP-A) No. 2000-136022).

In this system, after the image is recorded on the thermally reversible recording medium, the conveyed article is conveyed downstream from the predetermined position mentioned above on the conveying path, so that reading (e.g., scanning) of the scan image may be performed with a reading device.

In this case, if a reading error occurs, it might take some time to restore (resume) the system.

SUMMARY OF THE INVENTION

The present invention is an image recording system for recording an image on a thermally reversible recording medium held by a conveyed article conveyed on a predetermined conveying path in a predetermined conveying direction, including: a recording device provided on at least one side of the conveying path in a direction perpendicular to the conveying direction and configured to record an image on the thermally reversible recording medium of the conveyed article conveyed to a position facing the recording device by heating the thermally reversible recording medium, wherein the image includes a scan image to be read by a reading device when the conveyed article is conveyed downstream in the conveying direction from the position facing the recording device, and wherein the recording device records the scan image on the thermally reversible recording medium within a former half of the recording time of the image.

According to the present invention, even if a reading error occurs, it does not take time to restore the system.

Figure 1:
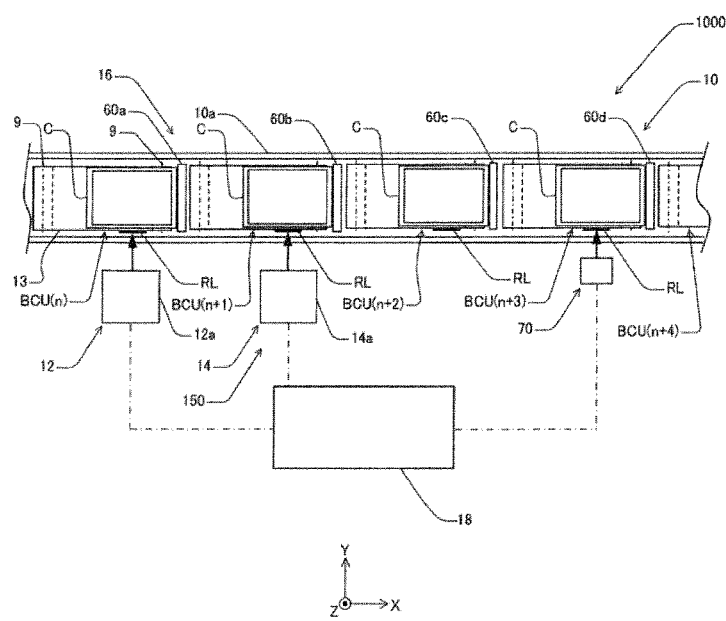
FIG. 1 is a diagram showing a schematic configuration of an image rewriting system according to an embodiment of the present invention.

DETAILED DESCRIPTION OF THE INVENTION (Image Recording Method)

An image recording method of the present invention includes at least an image recording step, and further includes other steps according to necessity.

<Image Recording Step>

The image recording step is a step of recording an image by heating a medium. For example, there are a method of recording an image by heating the medium with a thermal head, and a method of recording an image by heating the medium by irradiating it with laser light of which irradiation energy is adjusted based on the distance to the medium. Laser image recording is preferable, because it can record an image contactlessly and therefore can realize preferable image recording even when the medium has an inclination or a curve.

<Image Erasing Step>

When image recording is applied on a thermally reversible recording medium, there may be an image erasing step of erasing the image recorded on the thermally reversible recording medium by heating the thermally reversible recording medium on which the image is formed.

Examples of the method for heating the thermally reversible recording medium include conventionally known heating methods (contactless heating methods such as laser light irradiation, hot air, hot water, and an infrared heater, and contact heating methods such as a thermal head, a hot stamp, a heat block, and a heat roller). In consideration of a material flow line, the method of heating a thermosensitive recording medium such as a thermally reversible recording medium by irradiating it with laser light is particularly preferable because this method can erase an image contactlessly.

As a laser source, any of a YAG laser, a fiber laser, and a semiconductor laser is preferable.

<Reading Device>

A reading device used in the present invention is not particularly limited as long as it has a function of irradiating the image recorded on the recording medium with light, and based on whether the light reflected as a result is strong or weak, electrically reading the image information, and may be appropriately selected according to the purpose. Examples thereof include a barcode reader, a two-dimensional code reader, and an OCR reader. A barcode reader, a two-dimensional code reader, and an OCR reader are devices configured to read a barcode symbol, a two-dimensional code symbol, and OCR characters, respectively, and each include a scanner configured to convert optical information to electric information, and a decoder configured to convert electric information to character codes.

A barcode symbol is an image carrier that represents information with an arrangement of elongate rectangular bars and spaces and that can be read with a machine by being scanned in a direction perpendicular to the bars and spaces. A two-dimensional symbol is an image carrier that can be read with a machine by being scanned in both of the directions parallel with and perpendicular to itself. Examples of barcode symbols include JAN, Code39, and ITF. Examples of two-dimensional symbols include QR code, DataMatrix, and PDF417.

Examples of barcode readers and two-dimensional code readers include CCD type barcode readers and CCD type two-dimensional code readers that are configured to read an image by irradiating the image with light from a LED and receiving diffusely reflected light with a CCD image sensor. They are preferable in that they are small and inexpensive. Examples further include laser type barcode readers and laser type two-dimensional code readers that are configured to read an image by scanning the image with laser light and receiving diffusely reflected light with a light receiving element. They are preferable in that they can read from a wide range and can read with a moving member.

An embodiment of the present invention will be explained below based on FIG. 1 to FIG. 12C. FIG. 1 shows a schematic configuration of an image rewriting system 1000 according to an embodiment. In the present embodiment, for example, such an X, Y, and Z three-dimensional orthogonal coordinate system as shown in FIG. 1 is set, in which the Z axis direction is the vertical direction.

The image rewriting system 1000 rewrites an image by irradiating a rewritable label held by a transportation container C with laser light, as will be described in detail below. A rewritable label may also be referred to as "RL" hereinafter.

Here, an "image" means visible information such as characters, signs, lines, graphics, barcodes, and two-dimensional codes that indicates the content and the destination of the luggage contained in a container C, how many times the RL is used, etc. "Characters" include OCR characters that are read by OCR, i.e., optical character recognition.

Particularly, barcodes, two-dimensional codes, OCR characters, etc. are visible information to be read by a dedicated reading device, and may also be referred to as "scan image" in the following description. Further, in the following description, information that is included in an "image" and that is not a scan image may be referred to as "characters, etc." A "reading device" is a device configured to convert optical information of a barcode symbol, a two-dimensional symbol, characters, etc. to electric information, and may be a device including a decoder configured to convert electric information of a barcode symbol, a two-dimensional symbol, characters, etc. to character codes.

A RL is a thermally reversible recording medium that develops or fades color due to differences between heating and cooling processes, and contains a photothermal conversion material that generates heat upon absorption of laser light.

A container C has, for example, a RL, and in addition, a container body made of a rectangular parallelepiped box-like member having the RL attached to a side surface thereof. Here, a conveyed article, which is a target object to be conveyed, is a container body, but is not limited to this. In the following description, for the expediency, a container C and its content (luggage) may be together referred to as container C.

Here, the container body is, for example, a box-shaped receptacle that has excellent durability and can be used repeatedly. The material of the container body may be, for example, metal, resin, and cardboard. Among them, resin is preferable because resin has excellent durability, and is lightweight and easy to convey. Particularly, a polypropylene resin, an ABS resin (acrylonitrile-butadiene-styrene copolymerized synthetic resin), and a polyethylene resin are more preferable, because they can be produced at lower costs than other resins. The materials of the container body listed here are examples, and the material of the container body is not limited to these. Further, the container body may be a collapsible one that can be collapsed when nothing is put inside. A collapsible container body can be about "1/some number" the volume of a non-collapsible container body having the same size, and is very friendly for conveying.

As shown in FIG. 1, the image rewriting system 1000 includes a conveyor device 10, an erasing device 12, a recording device 14, a stopping device 16, a system control device 18, and a barcode checking device 70. In the following description, a system including the conveyor device 10, the recording device 14, and part of the system control device 18 of the image rewriting system 1000 may be referred to as an image recording system 150.

For example, the conveyor device 10 includes N (≥6) belt conveyor units as conveyor units provided at predetermined intervals in the X axis direction, and a support cradle 10a supporting the N belt conveyor units. In FIG. 1, from drawing constraints, only an X-axis-direction middle portion of the conveyor device 10 is illustrated. In the following description, the N belt conveyor units may also be referred to as BCU(1) to BCU (N) from −X side to +X side in their arranging order. The N belt conveyor units may be generically referred to as BCU, when it is unnecessary to distinguish them.

Figure 2:
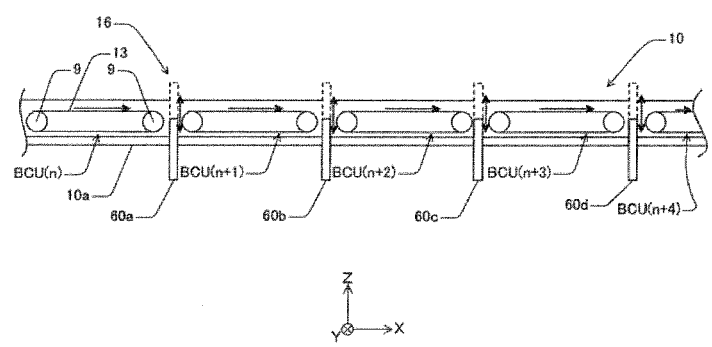
FIG. 2 is a diagram for explaining a conveyor device and a stopping device included in an image rewriting system.

For example, each BCU includes, for example, two rollers 9 which are spaced apart from each other in the X axis direction and of which axial direction is the Y axis direction, and an endless belt 13 wound over the two rollers 9, as shown in FIG. 2. The two rollers 9 are supported on the support cradle 10a rotatably about the Y axis. Here, one of the two rollers 9 is a driving roller, and the other is a driven roller. The driving rollers of the respective BCUs are individually driven and controlled by the system control device 18 via a driving device (not shown) including a motor, etc. (see FIG. 5).

The X axis direction dimension of each BCU is set to about the same or twice as large as the X axis direction dimension of the container C, for example. Further, the top surfaces of the BCUs are on a common plane parallel with the X-Y plane.

The conveyor device 10 configured as described above conveys a container C in the +X direction (a predetermined conveying direction) by passing the container C between two adjoining BCUs under instructions from the system control device 18. That is, the conveyor device 10 conveys a plurality of containers C in the +X direction by turns along a conveying path formed on the N BCUs. While a container C is being conveyed, the system control device 18 stops the container C at a BCU on which the container C is being mounted, by appropriately stopping driving this BCU.

Hence, the driving device mentioned above is preferably a device that can adjust the rotation speed of the driving roller. In this case, behaviors of the container C at the start and stop of conveying thereof can be stabilized, and the time taken for conveying the container C can be reduced. Further, the endless belt 13 of each BCU is preferably a belt having a high friction coefficient. In this case, slippage of the container C on the endless belt 13 at the start and stop of conveying thereof can be suppressed. As a result, the response of the container C when it starts to move and preciseness of the stop position thereof can be improved.

In terms of improving the conveying efficiency, the conveying speed of the container C is preferably 1 m/m n or higher, more preferably 5 m/min or higher, and still more preferably 10 m/min or higher. In terms of preventing the image rewriting system 1000 from growing in size, the conveying speed of the container C is preferably 200 m/min or lower, more preferably 100 m/min or lower, and still more preferably 50 m/min or lower. However, the conveying speed of the container C may be appropriately set according to necessity, and is not limited to the above ranges.

The erasing device 12 is provided, for example, on the −Y side of the conveyor device 10, i.e., on the −Y side of the conveying path described above.

In more detail, the erasing device 12 is provided at a position at which it faces (matches) a BCU(n). Here, 2≤n≤N−4.

Figure 3:
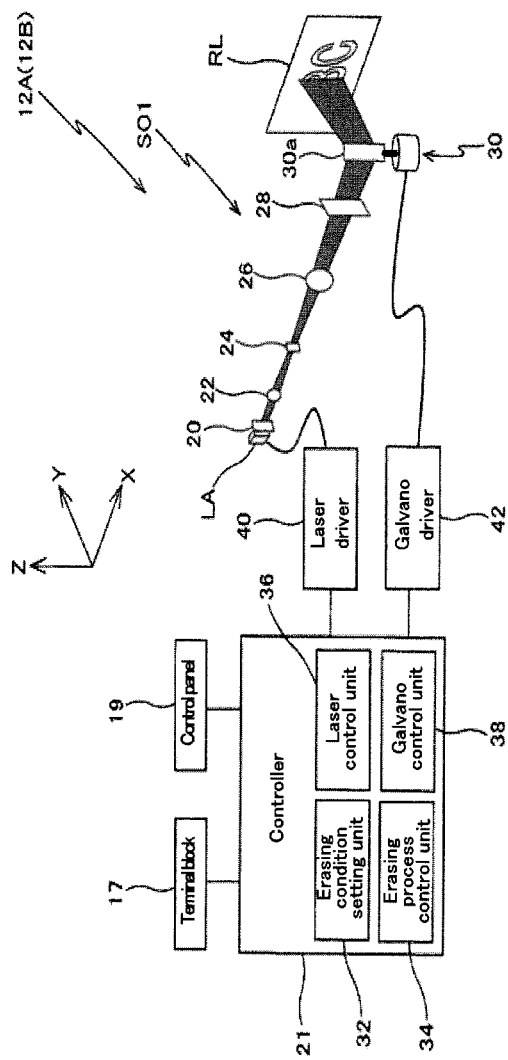
FIG. 3 is a diagram for explaining an erasing device included in an image rewriting system.

As shown in FIG. 3, the erasing device includes a one-dimensional laser array LA including a plurality of laser diodes (semiconductor lasers) arranged in one dimension, an optical system SO1, a terminal block 17, a control panel 19, a controller 21, and a housing 12a (see FIG. 1). Though not so shown, the one-dimensional laser array LA, the optical system SO1, the terminal block 17, and the controller 21 are housed in the housing 12a, and the control panel 19 is provided on, for example, a side surface (or the top surface) of the housing 12a.

For example, the one-dimensional laser array LA includes a plurality of (e.g., 17) unillustrated laser diodes (semiconductor lasers) arranged side by side in the Z axis direction (in one-dimensional arrangement). Here, the distance in the Z axis direction between the laser diode on the most +Z side and the laser diode on the most −Z side is set to, for example, 10 mm. For example, the one-dimensional laser array LA emits line-shaped laser light of which cross-section extends in the Z axis direction to the +X side.

For example, the optical system So1 includes a first cylindrical lens 20, a first spherical lens 22, a micro-lens array 24, a second spherical lens 26, a second cylindrical lens 28, and a galvano mirror device 30. In the following description, for the expediency, the first cylindrical lens 20, the first spherical lens 22, the micro-lens array 24, the second spherical lens 26, and the second cylindrical lens 28 may together be referred to as lens group.

The first cylindrical lens 20 is provided on the optical path of the line-shaped laser light emitted by the one-dimensional laser array LA, and slightly condenses this laser light in its width direction (i.e., a direction parallel with a direction orthogonal to the direction in which the plurality of laser diodes are arranged). Here, as the first cylindrical lens 20, a small-sized lens is provided in the proximity of the emission surface of the one-dimensional laser array LA.

The first spherical lens 22 is provided on the optical path of the line-shaped laser light that has passed through the first cylindrical lens 20, and condenses this laser light into the micro-lens array 24.

The micro-lens array 24 is provided on the optical path of the line-shaped laser light that has passed through the micro-lens array 22, and diffuses this laser light in its length direction (i.e., a direction parallel with the direction in which the plurality of laser diodes are arranged) to make the distribution of the light in the length direction uniform.

The second spherical lens 26 is provided on the optical path of the line-shaped laser light that has passed through the micro-lens array 24, and expands this laser light uniformly in the length direction and in the width direction.

The second cylindrical lens 28 is provided on the optical path of the line-shaped laser light that has passed through the second spherical lens 26, and slightly condenses this laser light in the width direction.

The galvano mirror device 30 is a galvanometer equipped with a swing mirror 30a that is configured to reflect the laser light and capable of making reciprocating swing motions. Here, for example, the swing mirror 30a is capable of swinging about the Z axis. The galvano mirror device 30 includes an angle sensor (not shown) configured to detect the rotation angle of the swing mirror 30a.

The galvano mirror device 30 is provided such that the swing mirror 30a is positioned on the optical path of the line-shaped laser light that has passed through the second cylindrical lens 28, and deflects this laser light roughly to the +Y side by reflecting the laser light while swinging about the Z axis.

Hence, the line-shaped laser light that has passed through the lens group is deflected by the galvano mirror device 30 to be emitted from an erasing laser light emission port (not shown) provided in the +Y-side side wall of the housing 12a to roughly the side, i.e., to cross, for example, several centimeters to several ten centimeters above the conveyor device 10.

Through this, the line-shaped laser light emitted by the one-dimensional laser array LA is homogenized in the energy density and expanded in the length direction (Z axis direction) by the lens group, deflected roughly to the +Y side by the galvano mirror device 30, and applied to the conveyed article being located at a position on the conveyor device 10 that faces the erasing laser light emission port. As a result, the line-shaped laser light of which cross-section extends in the Z axis direction is scanned over the conveyed article in the X axis direction.

The terminal block 17 includes signal input terminals configured to receive an erasing start signal, an interlock signal, an ambient temperature signal, an encoder signal, etc. output by the system control device 18, and signal output terminals configured to output a ready-for-erasing signal, an erasing-going-on signal, a trouble-occurred signal, etc. to the system control device 18.

Here, the erasing start signal is a signal for the erasing device to an erasing process. The interlock signal is a signal for urgently stopping an erasing process. The ambient temperature signal is a signal for correcting the laser power (output) depending on the ambient temperature. The encoder signal is a signal for detecting the moving speed of a rewritable label (work). The ready-for-erasing signal is a signal indicating that it is ready to receive an erasing start signal. The erasing-going-on signal is a signal indicating that erasing is being performed. The trouble-occurred signal is a signal indicating that the controller 21 has detected, for example, a trouble in the one-dimensional laser array LA, a trouble in the galvano mirror device 30, etc.

The control panel 19 is a user interface including a simple display and control switches, from which menus can be selected and numerical values can be entered. Here, for example, erasing conditions such as the scanning length of the laser light, the scanning speed of the laser light, the scanning direction of the laser light, laser power, an erasing start delay time, and a work speed can be designated from the control panel 19.

The controller 21 includes an erasing condition setting unit 32, an erasing process control unit 34, a laser control unit 36, a galvano control unit 38, etc.

The erasing condition setting unit 32 sets the erasing conditions such as the scanning length of the laser light, the scanning speed of the laser light, the scanning direction of the laser light, the laser power, the erasing start delay time and the work speed that are designated by the user from the control panel 19.

The erasing process control unit 34 processes input signals from the terminal block 17 to issue instructions to the laser control unit 36 and the galvano control unit 38, and also generates output signals to the terminal block 17.

The laser control unit 36 converts the output power value at which the laser is output that is instructed by the erasing process control unit 34 to an analog voltage and outputs it to a laser driver 40, and also generates a timing signal for igniting or extinguishing the laser.

The laser driver 40 is a circuit configured to generate a driving current for the one-dimensional laser array LA, and controls the laser power according to the value instructed by the laser control unit 36.

The galvano control unit 38 generates an analog signal for swinging the swing mirror 30a of the galvano mirror device 30 at a designated speed from a scanning start position instructed by the erasing process control unit 34 to a scanning end position likewise instructed by it, and outputs the analog signal to a galvano driver 42.

The galvano driver 42 is a circuit configured to control the swing angle of the swing mirror 30a of the galvano mirror device 30 according to the value instructed by the galvano control unit 38, and compares a signal from the angle sensor included in the galvano mirror device 30 with the value instructed by the galvano control unit 38 to output a drive signal to the galvano mirror device 30 in order to minimize the difference.

Returning to FIG. 1, the recording device 14 is provided, for example, on the −Y side of the conveyor device 10, i.e., on the −Y side of the conveying path, and on the +X side of the erasing device 12.

In more detail, the recording device 14 is provided, for example, at a position facing (corresponding to) the BCU (n+1), which adjoins from the +X side, the BCU(n) facing (corresponding to) the erasing device 12.

Figure 4:
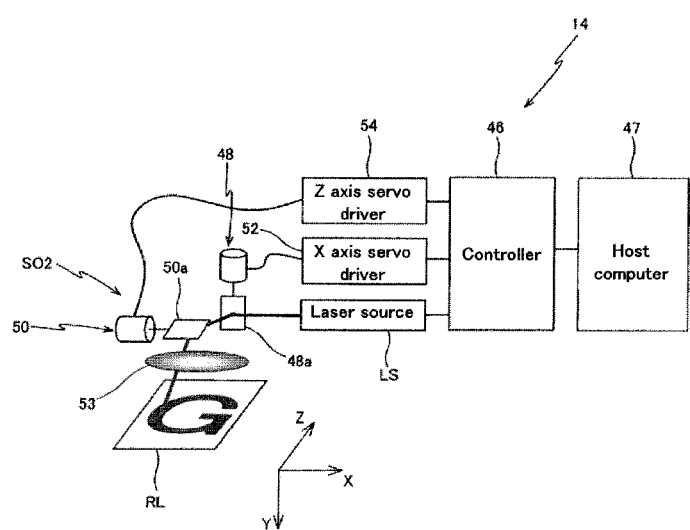
FIG. 4 is a diagram for explaining a recording device included in an image rewriting system.
Figure 5:
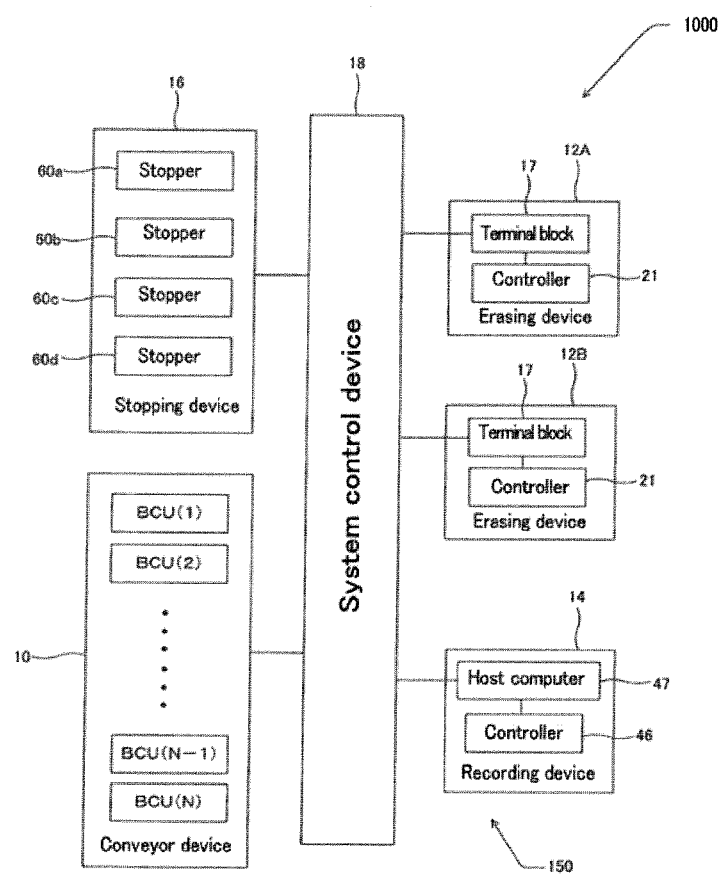
FIG. 5 is a block diagram showing the configuration of control of an image rewriting system.

As shown in FIG. 4, the recording device 14 includes, for example, a laser source LS including at least one (e.g., three) laser diode(s) (semiconductor laser(s)), an optical system SO2, a controller 46, a host computer 47, and a housing 14a (see FIG. 1) housing them.

For example, the laser source LS emits laser light in the −X direction.

For example, the optical system SO2 includes an X axis galvano mirror device 48, a Z axis galvano mirror device 50, and an fθ lens 53.

The X axis galvano mirror device 48 has the same configuration as the galvano mirror device 30 described above, except that a swing mirror 48a thereof swings about the Y axis.

For example, the X axis galvano mirror device 48 is provided such that the swing mirror 48a is positioned on the optical path of the laser light emitted by the laser source LS, and deflects this laser light roughly to the −Z side.

The Z axis galvano mirror device 50 has the same configuration as the galvano mirror device 30 described above, except that a swing mirror 50a thereof swings about the X axis.

For example, the Z axis galvano mirror device 50 is provided such that the swing mirror 50a is positioned on the optical path of the laser light deflected by the X axis galvano mirror device 48, and deflects this laser light roughly to the +Y side.

For example, the fθ lens 53 is provided on the optical path of the laser light deflected by the Z axis galvano mirror device 50, condenses this laser light onto the conveyed article being located on its +Y side, and at the same time, performs correction to make the swing positions of the swing mirrors of the X axis and Z axis galvano mirror devices 48 and 50 proportional to the displacement of a light spot formed on the conveyed article.

The laser light that has passed through the ft) lens 53 is emitted from a recording laser light emission port (not shown) formed in the +Y-side side wall of the housing 14a to roughly +Y side, i.e., to cross, for example, several centimeters to several ten centimeters above the conveyor device 10.

Through this, the light emitted by the laser source LS is deflected by the X axis and Z axis galvano mirror devices 48 and 50 by turns, and through the fθ lens 53, applied to the conveyed article being located at a position on the conveyor device 10 that faces the recording laser light emission port. As a result, a light spot is scanned over the conveyed article two-dimensionally in the X axis and the Z axis.

The controller 46 generates drawing data composed of line segments based on image information output by the host computer 47, and records (forms) an image on a recording target by controlling the swing positions of the swing mirrors of the X axis and Z axis galvano mirror devices 48 and 50 and the emission timing and emission power of the laser diodes. Here, for example, characters, signs, lines graphics, barcodes, etc. are recorded with a recording line width of about 0.25 mm.

The controller 46 controls the X axis galvano mirror device 48 via an X axis servo driver 52, and controls the Z axis galvano mirror device 50 via the Z axis servo driver 54.

The X axis servo driver 52 is a circuit configured to control the swing position of the swing mirror 48a of the X axis galvano mirror device 48 according to a value instructed by the controller 46, compares a signal from an angle sensor of the X axis galvano mirror device 48 with the value instructed by the controller 46, and outputs a drive signal to the X axis galvano mirror device 48 so as to minimize the difference.

Likewise, the Z axis servo driver 54 is a circuit configured to control the swing position of the swing mirror 50a of the Z axis galvano or device 50 according to a value instructed by the controller 46, compares a signal from an angle sensor of the Z axis galvano mirror device 50 with the value instructed by the controller 46, and outputs a drive signal to the Z axis galvano mirror device 50 so as to minimize the difference.

Returning to FIG. 1, the barcode checking device 70 is provided (set) at, for example, the −Y side of the conveyor device 10 and at the +X side of the recording device 14. In more detail, the barcode checking device 70 is provided at, for example, a position corresponding to BCU(n+3).

For example, the barcode checking device 70 is a device configured to check the image quality of a barcode recorded on a RL, before the barcode is read by a barcode scanner in a later process of sorting containers C.

Here, for example, the barcode checking device 70 is designed based on a laser scanner, and hence checks a barcode contactlessly by scanning the barcode and outputs the checking result (presence or absence of any error in the barcode recorded on the RL) to the system control device 18. Further, for example, the barcode checking device 70 includes a display for displaying the checking result, and a warning lamp that turns on when an error is present in the barcode. An error in a barcode is, for example, at least a portion of the barcode having failed to be recorded, the barcode being obscure, etc.

Instead of the barcode checking device, for example, a barcode verifying device in which a reading device and a verification software program are integrated may be used. In this case, a barcode read by the reading device can be verified with the software.

The stopping device 16 includes, for example, a plurality of (e.g., four) stoppers 60a to 60d, and a plurality of (e.g., four) Z actuators (not shown), as shown in FIG. 2.

The stoppers are each constituted by a flat plate member parallel with a Y-Z plane. The stopper 60a is provided between adjoining two BCU(n) and BCU(n+1) so as to be movable upward or downward with respect to the support cradle 10a. The stopper 60b is provided between adjoining two BCU(n+1) and BCU(n+2) so as to be movable upward or downward with respect to the support cradle 10a. The stopper 60c is provided between adjoining two BCU(n+2) and BCU(n+3) so as to be movable upward or downward with respect to the support cradle 10a. The stopper 60d is provided between adjoining two BCU(n+3) and BCU(n+4).

The four Z actuators are, for example, provided on the support cradle 10a so as to correspond to the four stoppers 60a to 60d, and can move the corresponding four stoppers 60a to 60d in the Z axis direction individually.

In more detail, the Z actuators can each move the corresponding stopper between a standby position located on the −Z side of the top surface of the conveyor device 10 (i.e., the top surface of each BCU) and a protruded position located on the +Z side of the top surface of each BCU by protruding therefrom.

The Z actuators may be, for example, an air cylinder, an oil cylinder, a solenoid, or, in sum, anything that can move the corresponding stoppers upward and downward. The four Z actuators are individually driven and controlled by the system control device 18.

The mechanism of recording and erasing an image to and from a rewritable label (RL) will be explained below.

This image recording and erasing mechanism is a mode of reversibly changing color tones by heat. This mode is constituted by a leuco dye and a reversible developer (hereinafter may also be referred to as "developer"). In this mode, color tones reversibly change between a transparent state and a color developed state by heat.

Figure 6A:
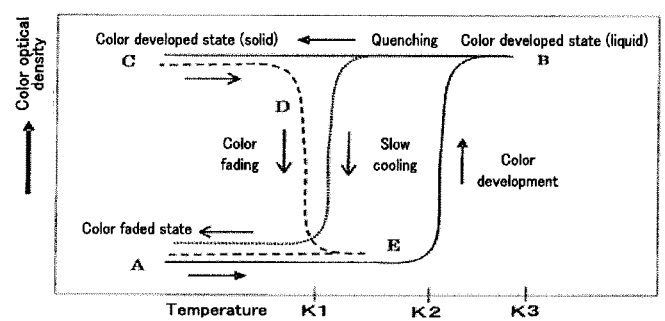
FIG. 6A is a graph showing a color developing-fading characteristic of a thermally reversible recording medium.
Figure 6B:
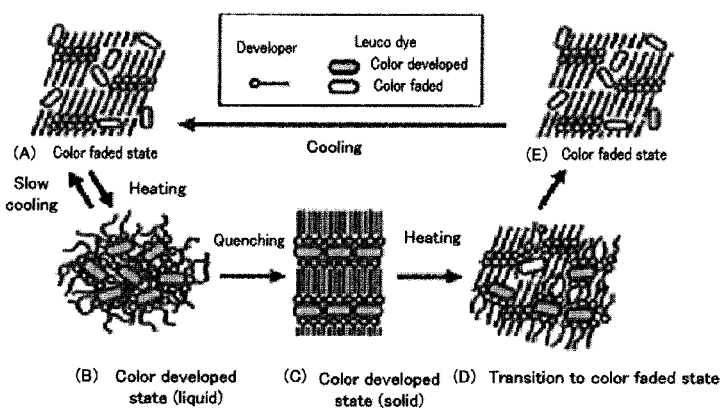
FIG. 6B is a diagram showing a mechanism of color developing and fading changes of a thermally reversible recording medium.

FIG. 6A shows an example temperature vs. color optical density change curve of a thermally reversible recording medium that includes a thermally reversible recording layer containing a resin in which a leuco dye and a developer are added. FIG. 6B shows a color developing and fading mechanism of a thermally reversible recording medium, of which color faded state and color developed state are changed to each other reversibly by heat.

First, as the thermally reversible recording layer that is initially in a color faded state (A) is warmed, the leuco dye and the developer melt and mix with each other at a melting temperature K2, and the layer develops a color and becomes a melt color developed state (B). By quenching the layer from the melt color developed state (B), it is possible to cool the layer to room temperature while keeping it in the color developed state, to thereby bring the layer into a secure color developed state (C) in which the color developed state is stabilized.

Whether this color developed state can be obtained or not depends on the temperature lowering rate of lowering the temperature from the melt color developed state (B). Through slow cooling, color fading occurs in the process of lowering the temperature, to thereby bring about the same color faded state (A) as the initial state, or a state in which the density is relatively lower than the density obtained by quenching.

When the layer is warmed again from the color developed state (C), color fading occurs (from D to E) at a temperature K1 lower than the melting temperature K2. When the layer is cooled from this state, it returns to the same color faded state (A) as the initial state.

The color developed state (C) obtained by quenching from the melt state is a state in which the leuco dye molecules and the developer molecules have been mixed to be able to cause a contact reaction, in which state they often form a solid state. In this state, the molten mixture (i.e., the color developed mixture) of the leuco dye and the developer has crystallized while being kept in the color developed state. When this state is formed, it can be considered that the color development has been stabilized.

On the other hand, a color faded state is a state in which the leuco dye and the developer are phase-separated. This state is a state in which the molecules of at least one compound have aggregated and formed a domain or have crystallized, and is considered to be a state in which the leuco dye and the developer have been stabilized as separated from each other through the aggregation or crystallization. In many cases, a more complete color fading occurs when, like this, the leuco dye and the developer have phase-separated and the developer has crystallized.

In both of color fading by slow cooling from the melt color developed state (B) and color fading by warming from the color developed state shown in FIG. 6A, the aggregation structure changes at the temperature K1, and phase separation or crystallization of the developer occurs.

Further, in FIG. 6A, after the recording layer has been repeatedly warmed to a temperature K3 equal to or higher than the melting temperature K2, it might cause an erasing error of not being able to be erased by heating to the erasing temperature. This is considered to be because the developer has thermally decomposed to become less easily aggregable or crystallizable to thereby become less easily separable from the leuco dye. In order to prevent deterioration of the thermally reversible recording medium due to repeating, it may be good to reduce the difference between the melting temperature K2 and the temperature K3 shown in FIG. 6A when heating the thermally reversible recording medium. This can realize prevention of deterioration of the thermally reversible recording medium due to repeating.

Next, an example operation of the image rewriting system 1000 will be explained with reference to FIG. 7A to FIG. 8C. The operation to be explained below is comprehensively controlled by the system control device 18. An unillustrated memory built in the host computer 47 of the recording device 14 pre stores information representing an image to be recorded on a RL, i.e., image information representing, for example, characters, etc. and a barcode that indicate, for example, the content and destination information of a luggage contained in the container C, how many times the RL is used, etc.

n−1 containers C that each have a RL on which an image is so pre-recorded and in each of which a luggage is contained have been individually mounted on the BCU(1) to the BCU(n−1) of the conveyor device 10 by an operator.

Here, each container C is mounted on the BCU such that a side surface of the container body on which the RL is attached comes to the −Y side, i.e., this side face can face the laser light emission port of the erasing device 12 and of the recording device 14. Note that FIG. 7A to FIG. 8C only show the X-axis-direction middle portion of the conveyor device 10, due to drawing constraints. In the following description, the n−1 containers C mounted on the conveyor device 10 may also be referred to as container C1 to container Cn−1 from +X side to −X side in their arranging order.

Initially, the four stoppers 60a to 60d are located at the standby positions.

First, the operator operates the control panel (not shown) of the system control device 18 to send a conveying start signal to the system control device 18.

Figure 7A:
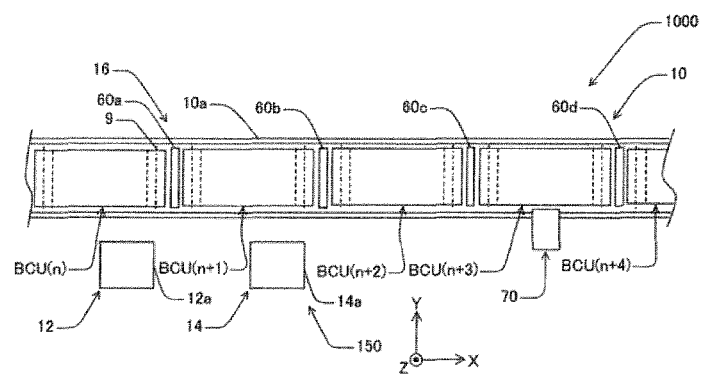
FIG. 7A is a diagram for explaining an operation of an image rewriting system (part 1).
Figure 7B:
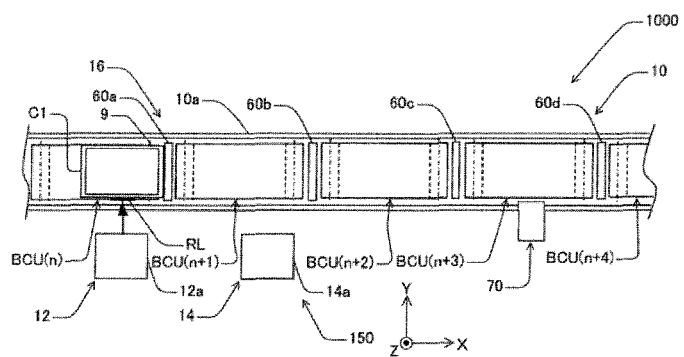
FIG. 7B is a diagram for explaining an operation of an image rewriting system (part 2).
Figure 7C:
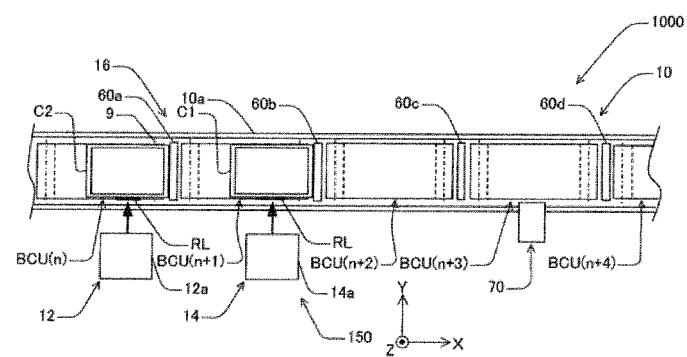
FIG. 7C is a diagram for explaining an operation of an image rewriting system (part 3).

The system control device 18 having received the conveying start signal moves the stopper 60a from the standby position to the protruded position, and also starts driving the BCU(1) to BCU(n) (see FIG. 7A). As a result, the containers C are conveyed in the +X direction by being passed between adjoining two BCUs. Here, the time required to pass the container C between adjoining two BCUs is set to, for example, 0.6 seconds.

Here, for example, a photoelectric sensor (not shown) configured to detect a container C conveyed over the conveyor device 10 is provided at a position corresponding to, for example, the BCU(n−1). A detection signal from this photoelectric sensor is sent to the system control device 18. The system control device 18 includes a timer (not shown) to constantly take hold of the position of each container C, i.e., on which BCU the container C is located, based on the timing at which it received the detection signal from the photoelectric sensor and the time elapsed from this timing.

Then, the system control device 18 stops driving the BCU(1) to BCU(n), when the container C1 has been passed from BCU(n−1) to BCU(n). As a result, the container C1 is decelerated and stops by colliding on the stopper 60a (see FIG. 7B).

Here, the X-axis-direction position of the stopper 60a is adjusted with respect to the erasing device 12 such that when a container C collides on the stopper 60a, the RL of the container C may face the erasing device 12 precisely. That is, the stopper 60a has a function of positioning the containers C at the position facing the erasing devices 12 precisely. "A container C facing the erasing device 12 precisely" means that the RL of the container C faces the laser light emission port of the erasing device 12.

Next, an erasing start signal is output from the system control device 18 to the erasing device 12.

The erasing device 12 having received the erasing start signal scans the RL of the container C with line-shaped laser light (e.g., with a length of 60 mm and a width of 0.5 mm) of which cross-section extends in the Z axis direction in the X axis direction at a predetermined speed for a predetermined time to thereby erase the image recorded on the RL. That is, the erasing device 12 irradiates the RL with laser light having a predetermined power to thereby erase the image recorded on the RL contactlessly. The erasing process by the erasing device 12 takes a time X (e.g., 1.5 seconds).

When the erasing process to the container C is completed, the erasing device 12 outputs an erasing completed signal to the system control device 18.

The system control device 18 having received the erasing completed signal from the erasing device 12 moves the stopper 60a from the protruded position to the standby position, moves the stopper 60b from the standby position to the protruded position, and starts driving BCU(1) to BCU (n+1).

Then, when the container C1 has been passed from BCU(n) to BCU(n+1) and the container C2 has been passed from BCU(n−1) to BCU(n), the system control device 18 stops driving BCU(1) to BCU(n+1). As a result, the containers C1 and C2 are decelerated and stop by colliding on the stoppers 60b and 60a respectively (see FIG. 7C).

Here, the X-axis-direction position of the stopper 60b is adjusted with respect to the recording device 14 such that when a container C collides on the stopper 60b, the RL of the container C may face the recording device 14 precisely. That is, the stopper 60b has a function of positioning the container C at a position facing the recording device 14 precisely. "A container C facing the recording device 14 precisely" means that the RL of the container C faces the laser light emission port of the recording device 14.

Then, the system control device 18 outputs a recording start signal to the recording device 14, and outputs an erasing start signal to the erasing device 12.

Figure 9:
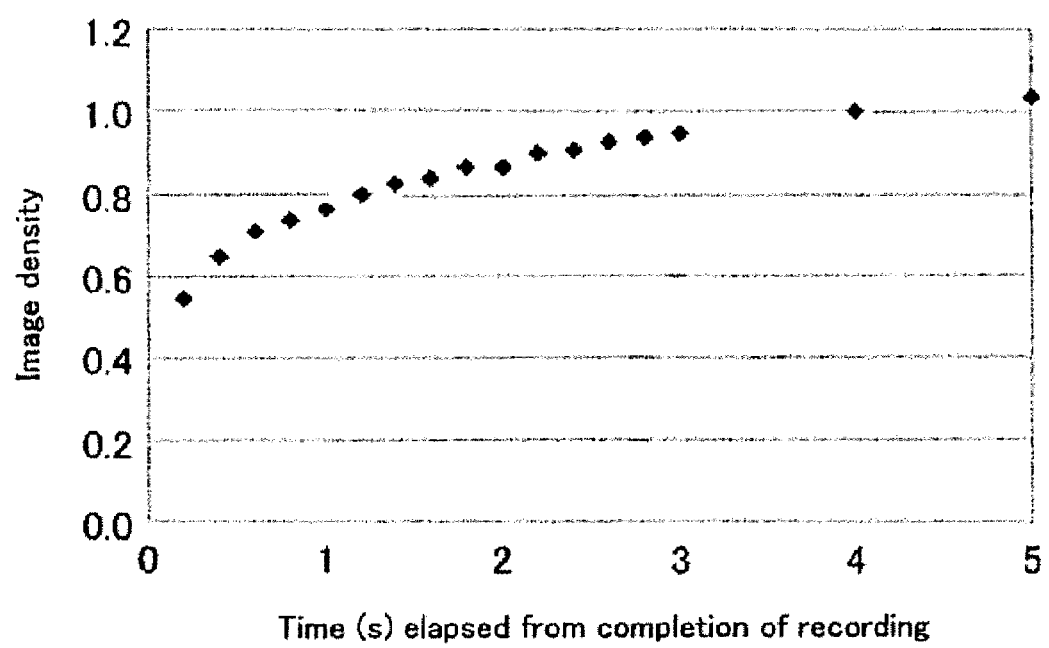
FIG. 9 is a diagram showing temporal changes of the density of an image recorded on a thermally reversible recording medium.

Here, as shown in FIG. 9, for example, the density of a barcode recorded on a RL gradually rises from the time when the recording of the barcode was completed (this time being a time 0 second), reaches a reference value (e.g., 0.8) at which the barcode can be read by the barcode checking device 70 when a predetermined time T (e.g., 1.2 seconds) has passed after the completion of the recording, then reaches, for example, 1.6 at a time of, for example, 100 seconds, and finally plateaus at, for example, about 1.65. The density of characters, etc. recorded on a RL also changes as shown in FIG. 9. On the other hand, if recorded on, for example, an irreversible thermosensitive recording medium, the density of a barcode remains constant all the time after the recording is completed. The predetermined time T mentioned above is roughly 2 seconds or shorter, although depending on the characteristic of the RL.

It can be seen that some time is taken for the density of a barcode recorded on a RL, which is a thermally reversible recording medium, to rise to the reference value mentioned above from when the recording is completed.

Hence, it is desirable that in recording of an image on a RL, recording of a barcode be completed as quickly as possible.

Figure 10A:
FIG. 10A is a diagram showing an image including a barcode recorded on a rewritable label (RL).
Figure 10B:
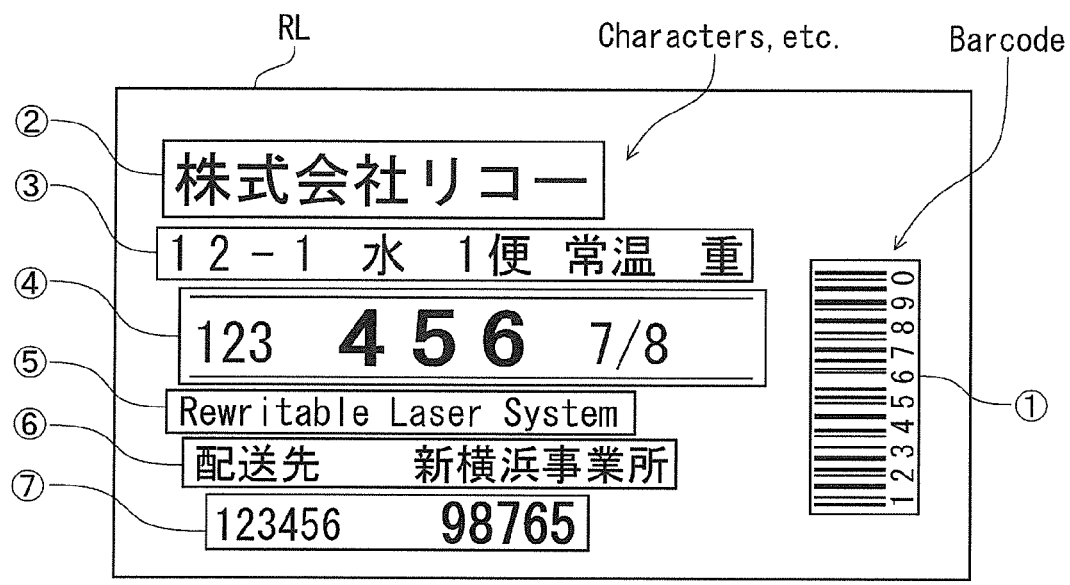
FIG. 10B is a diagram for explaining a recording order of an image including a barcode recorded on a RL (part 1).

Hence, for example, the recording device 14 records a barcode on the RL of the container C1 within a period from a time t0 at which it received the recording start signal (this being 0 second) until a time t1 (e.g., 0.3 seconds) (see FIG. 10B), and records characters, etc. on the RL of the container C1 within a period from the time t1 to a time t2 (e.g., 0.9 seconds) (see FIG. 10B). That is, the recording device 14 records the barcode within the former half of the recording time (with a length of, e.g., 0.9 seconds). As can be seen, a recording process by the recording device 14 takes a time Y (e.g., 0.9 seconds). In this case, a relationship of X>Y is satisfied, where X is a time taken for an erasing process by the erasing device 12, and Y is a time taken for a recording process by the recording device 14. Note that a "recording time" is a period of time from the start until the end of recording of an image.

Recording of an image on the RL of the container C1 by the recording device 14 is performed by scanning the RL with spot-shaped laser light two-dimensionally along the X axis and the Z axis in one stroke. That is, the recording device 14 records an image on the RL contactlessly by irradiating the RL with laser light having a predetermined power.

Meanwhile, the erasing device 2 performs an erasing process to the container C2 in the same manner as the erasing process to the container C1.

When the recording process to the container C1 is completed, the recording device 14 sends a recording completed signal to the system control device 18.

Figure 8A:
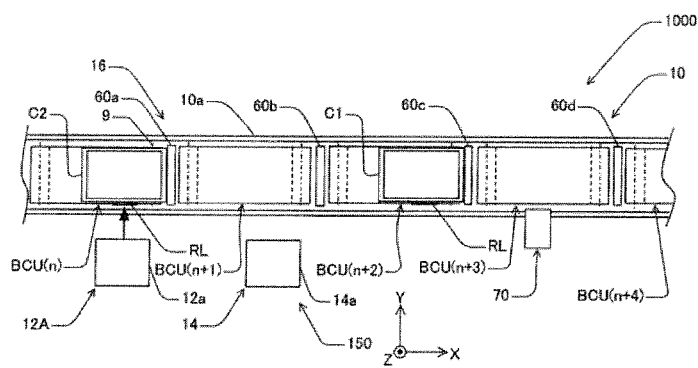
FIG. 8A is a diagram for explaining an operation of an image rewriting system (part 4).

The system control device 18 moves the stopper 60b from the protruded position to the standby position and starts driving BCU(n+1) to BCU(N), after a time Z has passed from when it received the recording completed signal from the recording device 14 (see FIG. 8A).

Here, the time X (e.g., 1.5 seconds), the time Y (e.g., 0.9 seconds), and the time Z satisfy a relationship of 0<Z≤X−Y (e.g., 0.6 seconds). Here, the time Z is set to, for example, 0.4 seconds.

The erasing device 12 sends an erasing completed signal to the system control device 18 when the erasing process to the container C2 is completed.

The system control device 18 having received the erasing completed signal from the erasing device 12 moves the stopper 60a from the protruded position to the standby position and starts driving BCU(1) to BCU(n).

Figure 8B:
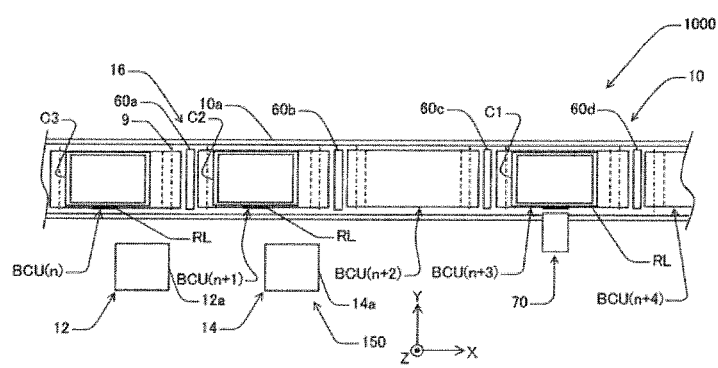
FIG. 8B is a diagram for explaining an operation of an image rewriting system (part 5).

When the container C1 is passed from BCU(n+2) to BCU(n+3), the RL of the container C1 faces the barcode checking device 70, and the barcode recorded on the RL is scanned and checked (see FIG. 8B). That is, presence or absence of any error in the barcode is checked. This check may be performed by conveying the container C, or may be performed by stopping the container C at the position facing the barcode checking device 70. When performing the check by conveying the container C1, it is possible to convey the container C1 at a speed lower than the normal conveying speed.

When the container C1 comes to face the barcode checking device 70, the density of the barcode recorded on the RL of the container C1 has reached the density (value) readable by the barcode checking device 70.

Figure 8C:
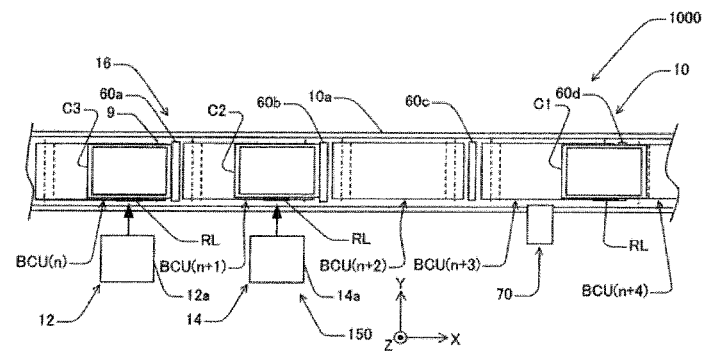
FIG. 8C is a diagram for explaining an operation of an image rewriting system (part 6).

Then, when the system control device 18 receives a checking result from the barcode checking device 70 that indicates that the barcode has no error, the system control device conveys the container C1 with BCU(n+3) to BCU(N) to a conveyor line that has a plurality of branching so points for sorting containers by, for example, delivery destinations and types of contents (luggage) (see FIG. 8C). This sorting is performed by the barcode recorded on the RL of the container C1 being read by a barcode scanner (or a barcode reader) that is installed on the conveyor line.

On the other hand, when the system control device 18 receives a checking result from the barcode checking device 70 that indicates that the barcode recorded on the RL of the container C1 has an error, the system control device stops driving BCU(n+3), and moves the stopper 60d from the standby position to the protruded position. As a result, the container C1 is decelerated and stops by colliding on the stopper 60d. The barcode checking device 70 displays that the barcode has an error on the display and turns on the warning lamp to notify the operator and prompt him/her to remove the container C1 from BCU(n+3). Along with this, the operator removes the container C1 from BCU(n+3) and adjusts the system according to the necessity. In this case, the container C1 may be mounted on such a BCU among BCU(1) to BCU(n−1) on which no container C is mounted, so that the container C1 may again be subjected to an erasing process, a recording process, checking by the barcode checking device 70, and subsequent processes.

After this, in the same manner, the container C2 is subjected to checking by the barcode checking device 70 and subsequent processes, and the containers C3 to Cn−1 are subjected to an erasing process, a recording process, checking by the barcode checking device 70, and subsequent processes.

As described above, the image rewriting system 1000 performs image rewriting by stopping a container C, which is conveyed on the conveyor device 10 (on a predetermined conveying path) in the X axis direction, at a position precisely facing the erasing device 12 to subject the container C to an erasing process, and after this, stopping the container C at a position precisely facing the recording device 14 to subject the container C to a recording process. The container C to which image rewriting has been performed is conveyed to a position precisely facing the barcode checking device 70 to have the barcode recorded on the RL checked, and then, for example, is removed or conveyed to a sorting conveyor line according to the checking result.

An image recording system 150 included in the image rewriting system 1000 according to the present embodiment explained above is an image recording system configured to record an image on a RL of a container C that is conveyed on a predetermined conveying path in a predetermined conveying direction (+X direction), and includes a recording device 14 that is provided on the −Y side of the conveying path and configured to record the image on the RL of the container C conveyed to a position facing the recording device by heating the RL. The image includes a scan image to be read (or to be subjected to a reading process) by the barcode checking device 70 when the container C is conveyed to the conveying-direction downstream side (+X side) of the position facing the recording device. The recording device 14 records the scan image on the RL within the former half of a recording time of the image (i.e., a period of time from the start till the end of recording of the image).

In this case, the density of the barcode rises during a period of time from when the recording of the barcode on the RL is completed until when the recording of the image on the RL is completed. Therefore, reading of the barcode (readability checking) can be started soon after the recording of the image is completed. Further, subsequent processes (e.g., removal or sorting of the container C) that depend on the checking result can be started soon.

As a result, even if the distance between the recording device 14 and the barcode checking device 70 is set short, it is possible to perform readability checking securely without spoiling the process efficiency.

In this case, even if one container C results in a reading error by the barcode checking device 70, there will be a smaller number of subsequent containers C on which a barcode would be recorded unreadably like the one container C. Therefore, it is possible to resume the system by stopping the operation of the system, removing the small number of containers C detected as reading errors, and adjusting the system according to the necessity.

As a result, the image recording system 150 does not take much time to be restored, when a reading error occurs.

As compared with ordinary thermosensitive paper, a thermally reversible recording medium (RL) is lower in the density developed immediately after heated, and takes more time to have the density rise. Therefore, it is necessary to secure a certain time from when recording of the scan image (e.g., a barcode) is completed until when readability checking of the scan image is started.

Hence, if the barcode checking device 70 is set at a position that is away from the recording device 14 by some degree, the density of the barcode of a container C will rise by the time when the container C faces the barcode checking device 70, even if the container C is conveyed downstream immediately after image recording to the container C is completed. Therefore, readability checking of the barcode can be performed immediately when the container C has come to face the barcode checking device 70.

However, in this case, when one container C results in a reading error by the barcode checking device 70, there will be a greater number of subsequent containers C on which a barcode would be recorded unreadably like the one container C, and the many containers C detected as reading errors need to be removed. That is, when a reading error occurs, it might take time to restore the system.

Further, when recording the image on a RL, the recording device 14 records the whole of characters, etc., after recording the barcode.

In this case, it is possible to maximize the period of time from when recording of the barcode is completed until when recording of the image is completed. Therefore, it is possible to maximize the density of the barcode at the time when recording of the image is completed, which will also lead to greater improvement to the process efficiency.

Further, it is not until the density of the barcode recorded on a RL becomes a density (value) readable by the barcode checking device 70 that the barcode is read by the barcode checking device 70. In this case, it is possible to securely prevent the barcode from being uncheckable (unreadable).

The density of the barcode recorded on a RL becomes a density (value) readable by the barcode checking device 70 when a predetermined time (e.g., 1.2 seconds) passes from when recording of the barcode on the RL is completed, whereas the period of time from when the former half of the recording time (e.g., with a length of 0.9 seconds) of recording the image on the RL passes until when reading of the barcode by the barcode checking device 70 is started is equal to or shorter (e.g., 1.1 seconds) than the predetermined time. In this case, the period of time from when recording of the image on the RL is completed until when reading of the sc barcode by the barcode checking device 70 is started is equal to or shorter (e.g., 0.65 seconds) than the predetermined time.

In this case, it is possible to start reading of the barcode in a shortest time after recording of the image is completed, which will lead to greater improvement to the process efficiency.

The barcode checking device 70 is provided on the conveying-direction downstream side (+X side) of the recording device 14, and reads the barcode recorded on the RL of a container C being located at the position facing itself. Therefore, it can read the barcode recorded on the RL of the container C automatically while conveying the container C or by stopping it.

The barcode recorded on the RL is checked by the barcode checking device 70 and subjected to a process suitable for the checking result. Therefore, for example, in the subsequent sorting process, a reading error by the barcode reader will be prevented.

Further, the image rewriting system 1000 includes the image recording system 150 and the erasing device 12 that is provided on the −X side of the recording device 14 (on the upstream side in the conveying direction of the container C). Therefore, the process efficiency of the whole system can be improved.

Further, the time X (e.g., 1.5 seconds) taken for the image recorded on the RL of a container C to be erased by the erasing device 12, so the time Y (e.g., 0.9 seconds) taken for the recording device 14 to record an image on the RL, and the time Z (e.g., 0.4 seconds) from when recording of the image on the RL by the recording device 14 is completed until when conveying of the container C is started satisfy the relationships of $X>Y$ and $0<Z \leq X-Y$ (e.g., 0.6 seconds).

In this case, it is possible to secure a long time from when recording of an image on a container C is completed until when this container C is conveyed to the position facing the barcode checking device 70, without lowering the operating rate of the erasing device 12 and the recording device 14. As a result, it is possible to securely bring the density of the barcode when the container C is conveyed to the position facing the barcode checking device 70 to equal to or higher than the reference value mentioned above, without bringing about degradation in the image rewriting process efficiency. Consequently, it is possible to obtain greater improvement to the process efficiency.

As compared with ordinary thermosensitive paper, a thermally reversible recording medium tends to be lower in the density developed immediately after heated and to take more time to have the density rise. This is considered to be because a developer used for the ordinary thermosensitive paper is made of a low molecular material and thus can react with a leuco dye smoothly, whereas a developer used for a thermally reversible recording medium is made of long-chain alkyl and hence takes time to react with the leuco dye because of steric bulkiness of long-chain alkyl.

The image recording system 150 is especially effective when a certain time is required from immediately after the RL is heated to have the image recorded until the image reaches a certain density. For example, the time required for the image density to reach 1.0 is preferably 0.1 s or longer, more preferably 0.2 s or longer, still more preferably 0.3 s or longer, yet more preferably 0.5 s or longer, and still more preferably 1.0 s or longer.

The image density immediately after heating can be measured by the following method. However, the present invention is not limited to this method.

(1) To capture the image recorded on the RL immediately after heating, with a device capable of image capturing (e.g., a digital video camera, a digital camera with a continuous shooting function, etc.)

(2) To capture a plurality of different images (e.g., gray scales) having known densities, with the same device as in (1)

(3) To obtain a correlation between densities and images from (2), and convert the image captured in (1) to a density A thermally reversible recording medium, which constitutes a rewritable label (RL), will be explained below in detail.

<Thermally Rewritable Recording Medium>

The thermally reversible recording medium preferably includes a support member, and a thermally reversible recording layer on the support member that contains a photothermal conversion material, and further includes other layers that are appropriately selected according to the necessity such as a first oxygen barrier layer, a second oxygen barrier layer, an ultraviolet absorbing layer, a back layer, a protecting layer, an intermediate layer, an undercoat layer, an adhesive layer, a sticky layer, a coloring layer, an air layer, and a light reflecting layer. These layers may be a single layer or may be a multi-layer. However, in order to suppress energy loss of the laser light to be applied that has a specific wavelength, a layer to be provided above the photothermal conversion layer should preferably be a layer made of a material that scarcely absorbs the specific wavelength.

Thermally Reversible Recording Layer

The thermally reversible recording layer is a thermally reversible recording layer that contains: a leuco dye, which is an electron-donating color-imparting compound; and a developer, which is an electron-accepting compound, changes its color tone reversibly by heat, and contains a binder resin and other components according to the necessity.

The leuco dye, which is an electron-donating color-imparting compound, and the reversible developer, which is an electron-accepting compound, change their color tones reversibly by heat and are materials that can express a phenomenon of causing visible changes reversibly along with temperature changes. They can change between a relatively color developed state and a relatively color faded state due to differences in heating temperatures and cooling rates after heating.

Leuco Dye

The leuco dye is a dye precursor that is inherently colorless or has a pale tone. The leuco dye is not particularly limited and can be appropriately selected from dyes conventionally known. Examples thereof include a triphenylmethane phthalide-based leuco compound, a triarylmethane-based leuco compound, a fluoran-based leuco compound, an azaphthalide-based leuco compound, and a chromenopyrazole-based leuco compound. Among these, fluoran-based or phthalide-based leuco dyes are particularly preferable because they are excellent in color developing/fading characteristic, hue, storage stability, etc.

Reversible Developer

The reversible developer is not particularly limited as long as it can develop and fade a color reversibly upon a thermal factor, and may be appropriately selected according to the purpose. Preferable examples thereof include a compound that contains in a molecule, one or more units of such a structure as elected from (1) a structure having a color developing ability of making the leuco dye develop a color (e.g., a phenolic to hydroxyl group, a carboxylic acid group, and a phosphate group) and (2) a structure controlling a cohesive force between molecules (e.g., a structure in which long-chain hydrocarbon groups are linked with each other). A divalent or higher linking group containing a hetero atom may be present at the linking site. Further, the long-chain hydrocarbon groups may themselves contain at least either a similar linking group or an aromatic group.

Phenol is particularly preferable as the structure having a color developing ability of making the leuco dye develop a color described in (1) above.

A long-chain hydrocarbon group containing 8 or more carbon atoms is preferable as the structure controlling a cohesive force between molecules described in (2) above. The number of carbon atoms contained is more preferably 11 or more. The upper limit of the number of carbon atoms is preferably 40 or less, and more preferably 30 or less.

The present invention is not limited to the embodiment described above, and may be modified in various manners. For example, in the embodiment described above, of the image to be recorded on a RL, a barcode (scan image) is recorded first, and after this, the whole of characters, etc. (images other than the scan image) is recorded. The present invention is not limited to this. In short, it is only necessary that a barcode be recorded within the former half of the recording time, and it is possible that a portion of characters, etc. be recorded before the barcode is recorded (see FIG. 10C to FIG. 11A).

In the embodiment described above, of the image to be recorded on a RL, the information to be read by a device having a reading function is one barcode. The present invention is not limited to this. In short, it is only necessary that the image to be recorded on a RL include at least either at least one barcode or at least one two-dimensional code (e.g., a QR code (Registered Trademark)). When the image to be recorded on a RL includes a barcode and a two-dimensional code, it is preferable that a checking device that is capable of checking both of barcodes and two-dimensional codes be provided at the +X side of the recording device 14 instead of the barcode checking device 70, or that a two-dimensional code checking device capable of checking two-dimensional codes be provided at the +X side or the −X side of the barcode checking device 70. When recording an image including a barcode and a two-dimensional code, it is preferable to record at least a portion of characters, etc. last.

In the embodiment described above, the density of a barcode becomes a density (value) readable by the barcode checking device 70 when a predetermined time (e.g., 1.2 seconds) passes from when recording of the barcode is completed, i.e., after recording of the image is completed, and the period of time from when the former half of the recording time passes until when reading of the barcode by the barcode checking device 70 is started is shorter (e.g., 1.1 seconds) than the predetermined time. The present invention is not limited to this. For example, the density of the barcode may become a density readable by the barcode checking device when a predetermined time T' (e.g., a time equal to or shorter than 0.6 seconds) passes from when recording of the barcode is completed, i.e., before recording of the image is completed. Also in this case, it is preferable that the period of time from when the former half of the recording time passes until when reading of the barcode by the barcode checking device 70 is started be shorter than the predetermined time T'. That is, it is preferable that the period of time from when recording of the image is completed until when reading of the barcode by the barcode checking device 70 is started be shorter than the predetermined time T'.

In the embodiment described above, what is provided (set) at the +X side of the recording device 14 (at the downstream side in the conveying direction of the container C) is the barcode checking device 70. The present invention is not limited to this. In short, any other device may be provided as long as such a device has a function of reading a barcode recorded on a RL. Specifically, a barcode scanner (a barcode reader) may be provided, or a barcode verifying device described above may be provided. When a barcode reader is provided, sorting, etc. may be performed without previous checking or verification. Or, for example, a human operator may hold a device having a barcode reading function in hand, and scan the barcode on a RL of a container C that is conveyed or stopped.

In the embodiment described above, a relationship of X>Y is satisfied, where X is a time taken for the image recorded on a RL to be erased by the erasing device 12, and Y is a time taken for the recording device 14 to record an image on the RL. However, a relationship of X≤Y may be satisfied. In this case, it is preferable that the time Z from when recording of the image on the RL by the recording device 14 is completed until when conveying of the container C is started be 0. As a result, it is possible to improve the operating rate of the erasing device 12 and the recording device 14 to the utmost level, and hence to improve the image rewriting process efficiency, under the condition of X≤Y.

In the embodiment described above, the stopping device 16 including a plurality of stoppers is provided, but it needs not be provided. In this case, a container C will be stopped at the positions precisely facing the erasing device 12 and the recording device 14 by means of only driving control on the conveyor device 10 by the system control device 18.

In the embodiment described above, the stopping device 16 includes the four stoppers 60a to 60d. The present invention is not limited to this. For example, the stopping device needs not include the stopper 60c that is provided between BCU(n+2) and BCU(n+3). Further, a stopper may also be provided between at least another set of two adjoining BCUs than the sets of two adjoining BCUs between which the four stoppers 60a to 60d are provided respectively.

In the embodiment described above, a flat plate member is used as the stoppers. The present invention is not limited to this. Any other member may be used, as long as it can stop a container C at a position precisely facing the erasing device or the recording device. A preferable example of the member to be used as the stoppers is a member that can absorb a certain amount of the energy of collision with a container C (i.e., does not have so high a coefficient of restitution), and that is excellent in a container C positioning precision.

In the embodiment described above, BCUs (belt conveyor units) are employed as the plurality of conveyor units included in the conveyor device 10. The present invention is not limited to this. For example, a roller conveyor unit including a plurality of rollers that are arranged side by side in the X axis direction and of which axial direction is the Y axis direction may be employed. This roller conveyor unit is configured like a belt conveyor unit from which the endless belt is removed. Preferred examples of the plurality of rollers of the roller conveyor unit are those that have a high friction coefficient on their outer circumferential surface.

In the embodiment described above, the conveyor device 10 is employed as a conveyor device. The present invention is not limited to this and may be modified appropriately. For example, a device obtained by combining a belt conveyor unit and a roller conveyor unit may be employed as a conveyor device. Specifically, a belt conveyor unit that is capable of precisely controlling the position of a container C may be used in a region including the position at which a RL precisely faces the recording device 14, in which region precision is required for positioning a container C on the conveying path, whereas a roller conveyor unit having a simple configuration and excellent in durability may be used in a region in which not so high a precision is required for positioning a container C on the conveying path. Further, when the conveying speed of a conveyed article is relatively low, the conveyor device may be configured only by a roller conveyor unit.

In the embodiment described above, the plurality of BCUs of the conveyor device 10 are provided side by side in the X axis direction, i.e., on a line extending in the X axis direction. The present invention is not limited to this. For example, at least a part of the BCUs may be provided on a curve that is parallel with an X-Y plane.

In the embodiment and modified example described above, the recording device 14 is provided on one side (e.g., on the −Y side) of the conveyor device 10. However, it may be provided on the other side (e.g., on the +Y side) of the conveyor device 10, or may be provided on both sides (e.g., on the +Y side and −Y side) thereof. When the recording device 14 is provided on one side or the other side, a RL needs to be attached to a position on a container C that at least faces the recording device 14. When recording devices 14 are provided on both sides, a RL needs only to be attached to at least one position on a container C that faces at least one recording device 14. When recording devices 14 are provided on both sides and a RL is attached to only one side of a container C, it is unnecessary to take care to bring the side of the container C to which the RL is attached to the side on which a recording device 14 is provided when mounting the container C on the conveyor device 10. Therefore, it is possible to prevent an error of no image having been recorded on the RL because of the difference of the side on which the recording device 14 is provided and the side to which the RL is attached.

In the embodiment described above, semiconductor lasers are used as the lasers of the erasing device 12 and the recording device 14. The present invention is not limited to this, and other types of lasers may be used. Examples of laser sources include YAG laser light, fiber laser light, semiconductor laser light, and fiber coupled laser. In order to realize laser recording that will provide favorable visibility, it is necessary to uniformly heat the recording region of a medium that is irradiated with the laser. However, normal laser light has a Gaussian distribution in which the light intensity is strong at the center portion. If an image is recorded with such laser light, a contrast appears to make the peripheral region darker than the center region, which would damage the visibility and degrade the image quality. As a means for avoiding this, a light distribution modifying optical element (e.g., an aspheric lens and a DOE element) may be incorporated into the optical path. However, this would increase the device costs, and is accompanied by a problem of making the optical design for avoiding aberration-based light distribution distortion complicated. Here, if a fiber coupled laser is used, laser light to be emitted from the fiber end can easily obtain a top hat shape, even if there is no light distribution modifying optical element. Therefore, use of a fiber coupled laser is particularly preferable, because this enables image recording that will provide high visibility.

Further, with other types of lasers having a Gaussian distribution, the beam, while kept in a Gaussian distribution, increases in the diameter as the distance from the focal point increases, to thereby degrade the visibility with a line width that increases as the distance from the focal point increases. On the other hand, if a fiber coupled laser is used, the light distribution will be a top hat shape at the focal point, and as the distance from the focal point increases, the beam diameter does increase but the diameter of the high intensity portion at the center of the light distribution does not increase. Therefore, use of a fiber coupled laser is particularly preferable because the image line width does not increase even though the distance from the focal point increases.

Normally, laser light has a Gaussian distribution at the focal point and also at positions away from the focal point, and only increases in the beam diameter. Therefore, when the energy density is kept constant, the printing line width increases in proportion to the beam diameter.

With the fiber coupled laser, laser light couples with the fiber and is made uniform through the fiber, to thereby form a top-hat-shaped light distribution at the focal point. As the distance from the focal point increases, the beam diameter increases, but the light distribution becomes similar to a Gaussian distribution. A printing line is developed when the energy becomes higher than a certain level. Therefore, even if the energy density is kept constant, as long as printing is done with the center portion of the Gaussian distribution, the line width is kept from increasing even though the beam diameter increases as the distance from the focal point increases, to thereby realize almost the same line width as that obtained at the focal point.

The image rewriting system 1000 according to the embodiment described above is provided with one erasing device and one recording device. However, a plurality of at least either erasing device or recording device may be provided side by side in the X axis direction. In this case, it is preferable to increase the number of erasing devices because an erasing device consumes a longer process time than a recording device.

In the embodiment described above, a configuration for erasing an image by irradiating a RL with laser light is employed as the erasing device. However, a configuration for erasing an image by bringing, for example, a heated roller or a heated plate into contact with a RL may be employed.

In the embodiment described above, a configuration for recording an image by irradiating a RL with laser light is employed as the recording device. However, a configuration for recording an image by bringing, for example, a thermal head into contact with a RL may be employed.

In the embodiment described above, the image recording system 150 is used as part of the image rewriting system 1000. The present invention is not limited to this. For example, only the image recording system 150 may be used to convey a container C having a RL to which no image is recorded and perform a recording process, barcode checking, and subsequent processes to the container C.

In the embodiment described above, a container is employed as a conveyed article. The present invention is not limited to this. For example, a conveyed article may be a receptacle other than a container, a packed article, etc.

The numerical values used in the embodiment described above are mere examples, and the present invention is not limited to these.

EXAMPLES

Examples of the present invention will be explained below. However, the present invention is not limited to the Examples below.

In each Example, image density on a thermally rewritable recording medium REWRITABLE LASER MEDIA RLM-100L manufactured by Ricoh Company Ltd. was measured according to the following procedures (1) to (3) immediately after recording (see FIG. 9).

(1) 8 mm×8 mm (=64 mm$^2$) solid images were recorded on the thermally rewritable recording media, while being continuously shot with a digital camera CX-5 manufactured by Ricoh Company Ltd.

(2) KODAK GRAY SCALE manufactured by Kodak Japan Ltd. was shot with a digital camera CX-5 manufactured by Ricoh Company Ltd.

(3) From the result of (2), density histogram (from 0 to 255) for the photographs of the respective regions of KODAK GRAY SCALE manufactured by Kodak Japan Ltd. was associated with density values. Density values of the images shot in (1) were calculated by approximation with a cubic function of the density histogram.

Examples of the present invention will be explained below with reference to FIG. 10A to FIG. 12C. In the images shown in FIG. 10B to FIG. 10D, FIG. 11A to FIG. 11C, and FIG. 12 and FIG. 12C, the pieces of information in a plurality of regions enclosed within a plurality of quadrangular frames are recorded in the order of numbers assigned to the plurality of regions.

Example 1

A container was conveyed by the conveyor device at a conveying speed of 30 m/min, and stopped at a position facing a laser marker (recording device) provided at one side (e.g., −Y side) of the conveying path in the direction perpendicular to the conveying path, to thereby record an image on the RL of the container. The time from when recording of the image shown in FIG. 10A by the laser marker was completed until when conveying of the container was started was set to 0.1 s. Here, a laser marker rewritable laser marker LDM200-110 manufactured by Ricoh Company Ltd. was used as the laser marker, a container ORICON 32B manufactured by Sanko Co., Ltd. was used as the container, and a thermally reversible recording medium REWRITABLE LASER MEDIA RLM-100L manufactured by Ricoh Company Ltd. was used as the RL.

The time from when conveying of a subsequent container (container 2), of which conveying from the upstream side on the conveying path to the position facing the laser marker was to be started at the same time as the start of conveying of the container described above (container 1) to which recording had been applied, was started until when the container 2 reached the position facing the laser marker was set to 0.65 s. The time from when the container 2 reached the position facing the laser marker until when recording by the laser marker was started was set to 0.20 s. The laser marker was adjusted to have a laser output of 18.2 W and a scanning speed of 3,000 mm/s. The image shown in FIG. 10A including a barcode was recorded in the writing order indicated in FIG. 10B, so that the barcode may be recorded within a period of time from 0.00 s to 0.21 s, i.e., within the former half of the recording time (with a length of 0.83 s).

Reading (scanning) of the barcode of the container 1 was performed with a barcode scanner that was set at a position that was 350 mm downstream from the laser marker in the conveying direction. The barcode could be successfully read when the image had been recorded properly (with 26 times out of 100 times of scanning resulting in successful reading). Here, a barcode scanner BL-1301HA manufactured by Keyence Corporation was used as the barcode scanner.

When a printing error had occurred and the image had not been recorded properly, the control device stopped the image recording by the laser marker to prevent the image from being recorded on the container 2. As a result, the only wasteful effort made was to recall the container 1 and record one piece of recording information again (see Table 1).

TABLE 1

|  | A | B | C | D |
|---|---|---|---|---|
| Ex. 1 | 0.00-0.21 | 350 | 26 | 0 |
| Ex. 2 | 0.07-0.28 | 350 | 22 | 0 |
| Ex. 3 | 0.09-0.30 | 350 | 20 | 0 |
| Ex. 4 | 0.16-0.37 | 350 | 16 | 0 |
| Comp. Ex. 1 | 0.46-0.67 | 350 | 0 | — |
| Comp. Ex. 2 | 0.62-0.83 | 350 | 0 | — |
| Comp. Ex. 3 | 0.46-0.67 | 500 | 16 | 1 |
| Comp. Ex. 4 | 0.62-0.83 | 570 | 16 | 1 |

A: the recording start time and recording end time (s) of the barcode
B: the distance (mm) in the conveying direction between the set position of the barcode scanner and the set position of the laser marker
C: the readability of the barcode when the image was recorded properly (the number of times the barcode was successfully read out of 100 times of scanning)
D: the number of containers to be recalled when a printing error occurred, except the container (container 1) on which the printing error actually occurred Example 2

Figure 10C:
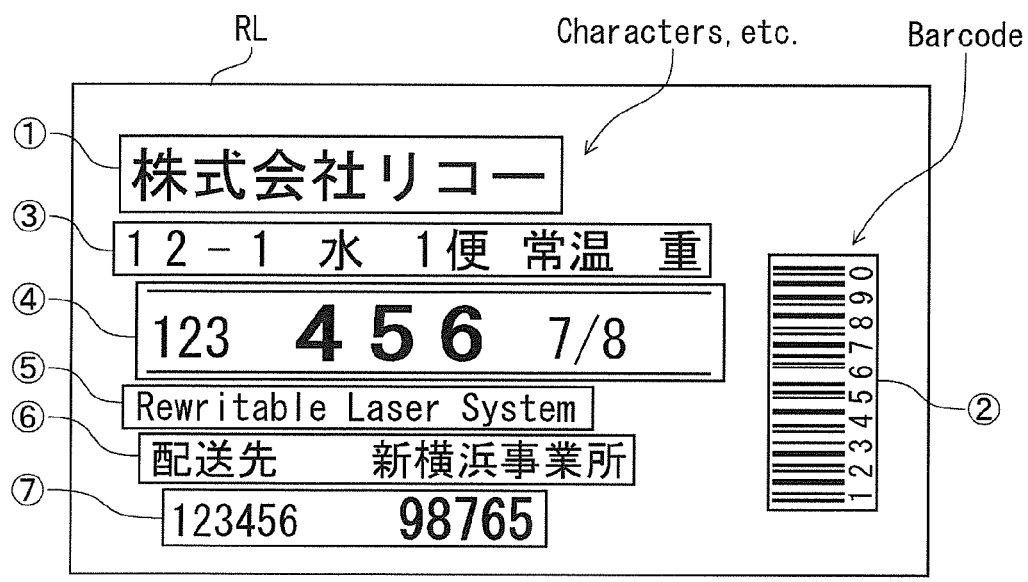
FIG. 10C is a diagram for explaining a recording order of an image including a barcode recorded on a RL (part 2).

Reading (scanning) of a barcode was performed on the same conditions as Example 1, except that the image shown in FIG. 10A including a barcode was recorded in the writing order indicated in FIG. 10C so that the barcode may be recorded within a period of time from 0.07 to 0.28 s, i.e., within the former half of the recording time (with a length of 0.83 s). As a result, the barcode could be successfully read when the image had been recorded properly (with 22 times out of 100 times of scanning resulting in successful reading). When a printing error had occurred, and the image had not been recorded properly, the control device stopped the image recording by the laser marker to prevent the image from being recorded on the container 2. As a result, the only wasteful effort made was to recall the container 1 and record one piece of recording information again (see Table 1).

Example 3

Figure 10D:
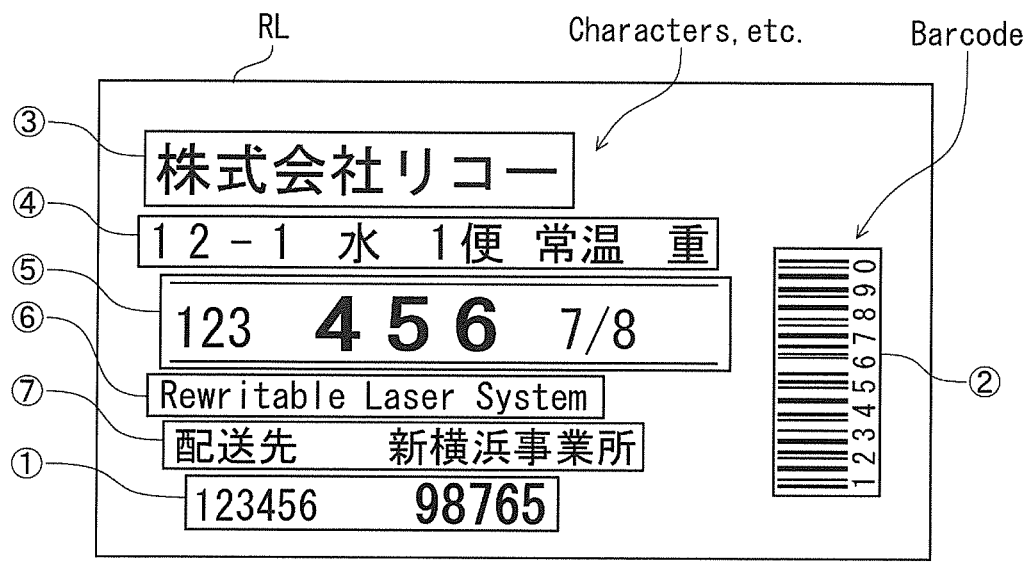
FIG. 10D is a diagram for explaining a recording order of an image including a barcode recorded on a RL (part 3).

Reading (scanning) of a barcode was performed on the same conditions as Example 1, except that the image shown in FIG. 10A including a barcode was recorded in the writing order indicated in FIG. 10D so that the barcode may be recorded within a period of time from 0.09 s to 0.31 s, i.e., within the former half of the recording time (with a length of 0.83 s). As a result, the barcode could be successfully read when the image had been recorded properly (with 20 times out of 100 times of scanning resulting in successful reading). When a printing error had occurred, and the image had not been recorded properly, the control device stopped the image recording by the laser marker to prevent the image from being recorded on the container 2. As a result, the only wasteful effort made was to recall the container 1 and record one piece of recording information again (see Table 1).

Example 4

Figure 11A:
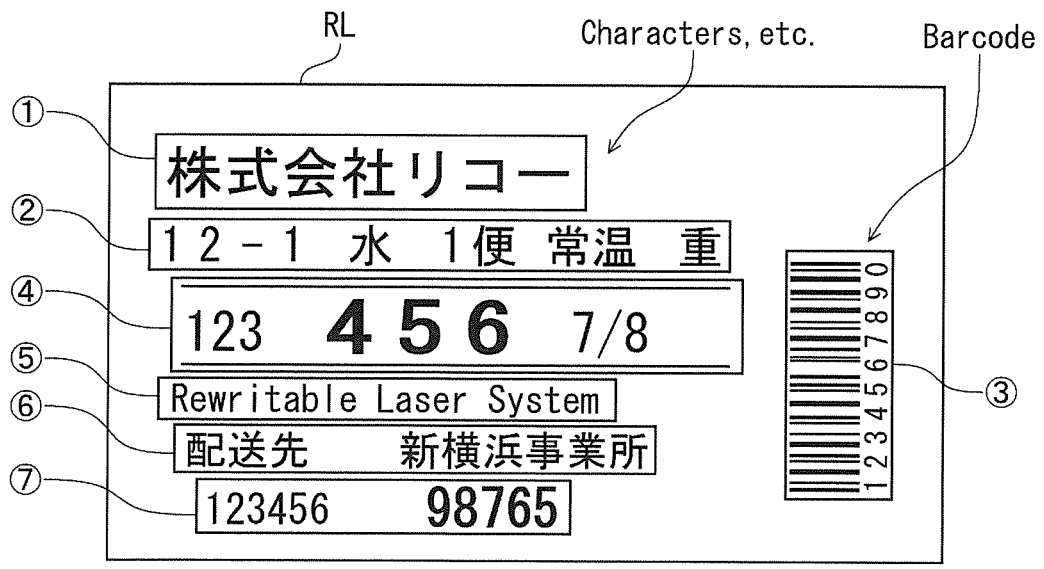
FIG. 11A is a diagram for explaining a recording order of the image shown in FIG. 10A (part 4).

Reading (scanning) of a barcode was performed on the same conditions as Example 1, except that the image shown in FIG. 10A including a barcode was recorded in the writing order indicated in FIG. 11A so that the barcode may be recorded within a period of time from 0.16 s to 0.37 s, i.e., within the former half of the recording time (with a length of 0.83 s). As a result, the barcode could be successfully read when the image had been recorded properly (with 16 times out of 100 times of scanning resulting in successful reading). When a printing error had occurred, and the image had not been recorded properly, the control device stopped the image recording by the laser marker to prevent the image from being recorded on the container 2. As a result, the only wasteful effort made was to recall the container 1 and record one piece of recording information again (see Table 1).

Comparative Example 1

Figure 11B:
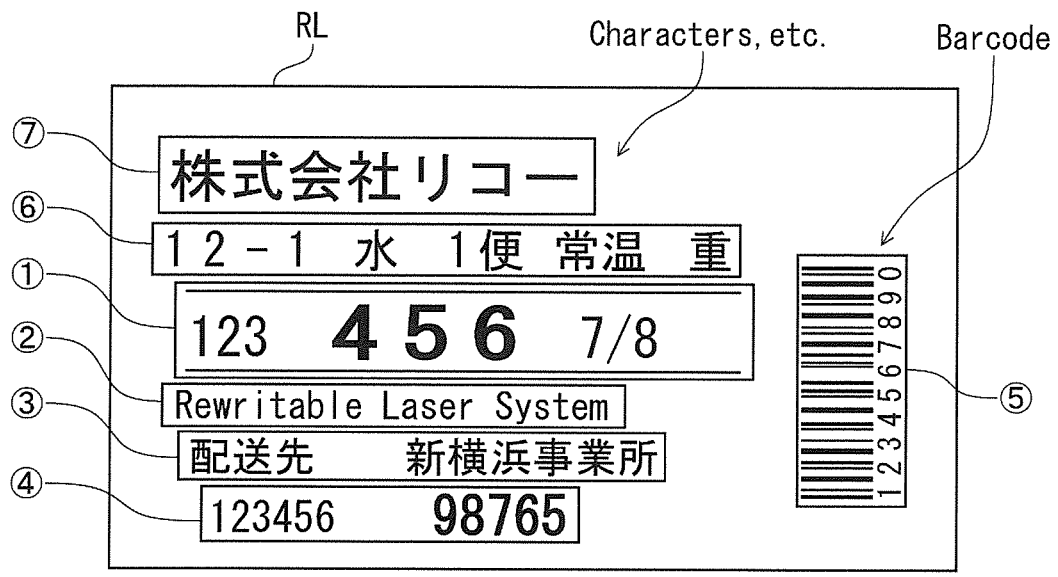
FIG. 11B is a diagram for explaining a recording order of the image shown in FIG. 10A (part 5).

Reading (scanning) of a barcode was performed on the same conditions as Example 1, except that the image shown in FIG. 10A including a barcode was recorded in the writing order indicated in FIG. 11B so that the barcode may be recorded within a period of time from 0.46 s to 0.67 s, i.e., within the latter half of the recording time (with a length of 0.83 s). As a result, the barcode could not be successfully read even when the image had been recorded properly (see Table 1).

Comparative Example 2

Figure 11C:
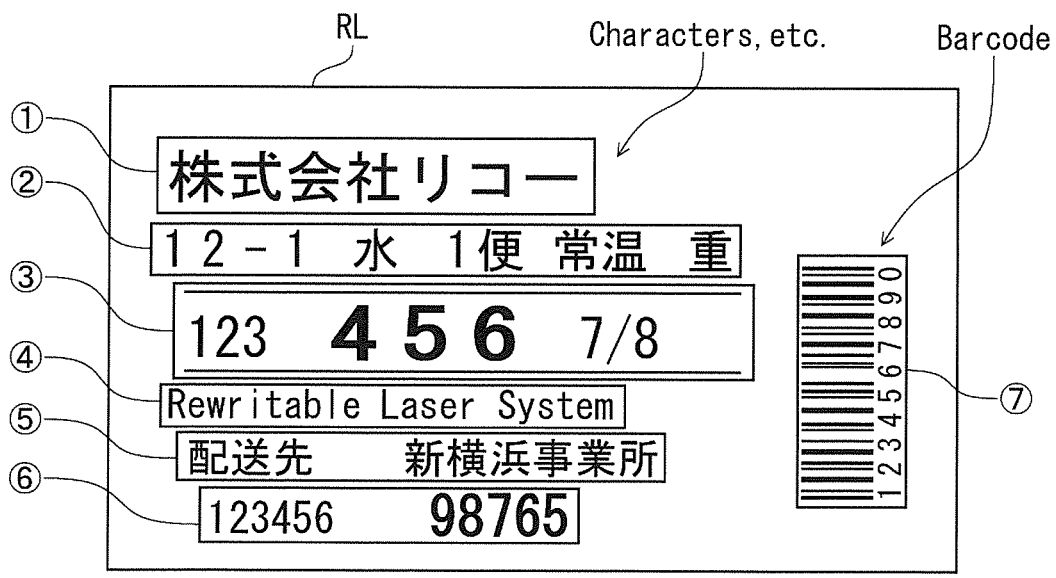
FIG. 11C is a diagram for explaining a recording order of the image shown in FIG. 10A (part 6).

Reading of a barcode was performed on the same conditions as Example 1, except that the image shown in FIG. 10A including a barcode was recorded in the writing order indicated in FIG. 11C so that the barcode may be recorded within a period of time from 0.62 s to 0.83 s, i.e., within the latter half of the recording time (with a length of 0.83 s). As a result, the barcode could not be successfully read even when the image had been recorded properly (see Table 1).

Comparative Example 3

Reading of a barcode was performed on the same conditions as Comparative Example 1, except that the barcode scanner was set at a position that was 500 mm downstream from the laser marker in the conveying direction. As a result, the barcode could be successfully read when the image had been recorded properly (with 16 times out of 100 times of scanning resulting in successful reading). When a printing error had occurred, and the image had not been recorded properly, the control device stopped the image recording by the laser marker, but the image had also been recorded on the container 2. As a result, a wasteful effort of recalling the container 1 and the container 2 and recording two pieces of recording information again was made (see Table 1).

Comparative Example 4

Reading of a barcode was performed on the same conditions as Comparative Example 2, except that the barcode scanner was set at a position that was 570 mm downstream from the laser marker in the conveying direction. As a result, the barcode could be successfully read when the image had been recorded properly (with 16 times out of 100 times of scanning resulting in successful reading). When a printing error had occurred, and the image had not been recorded properly, the control device stopped the image recording by the laser marker, but the image had also been recorded on the container 2. As a result, a wasteful effort of recalling the container 1 and the container 2 and recording two pieces of recording information again was made (see Table 1).

Example 5

A container was conveyed by the conveyor device at a conveying speed of 30 m/min, and stopped at a position facing a laser marker (recording device) provided at one side (e.g., −Y side) of the conveying path in the direction perpendicular to the conveying path, to thereby record an image on the RL of the container. The time from when recording by the laser marker of the image shown in FIG. 12A including a two-dimensional code was completed until when conveying of the container was started was set to 0.1 s. Here, a laser marker rewritable laser marker LDM200-110 manufactured by Ricoh Company Ltd. was used as the laser marker, a container ORICON 32B manufactured by Sanko Co., Ltd. was used as the container, and a thermally reversible recording medium REWRITABLE LASER MEDIA RLM-100L manufactured by Ricoh Company Ltd. was used as the RL.

The time from when conveying of a subsequent container (container 2), of which conveying from the upstream side on the conveying path to the position facing the laser marker was to be started at the same time as the start of conveying of the container described above (container 1) to which recording had been applied, was started until when the container 2 reached the position facing the laser marker was set to 0.65 s. The time from when the container 2 reached the position facing the laser marker until when recording by the laser marker was started was set to 0.20 s. The laser marker was adjusted to have a laser output of 18.2 W and a scanning speed of 3,000 mm/s. The image shown in FIG. 12A including a two-dimensional code was recorded in the writing order indicated in FIG. 12B, so that the two-dimensional code (e.g., a QR code (Registered Trademark)) may be recorded within a period of time from 0.00 s to 0.51 s, i.e., within the former half of the recording time (with a length of 1.14 s).

Reading (scanning) of the two-dimensional code of the container 1 was performed with a two-dimensional code scanner that was set at a position that was 350 mm downstream from the laser marker in the conveying direction. The two-dimensional code could be successfully read when the image had been recorded properly. Here, a two-dimensional code scanner SR-610 manufactured by Keyence Corporation was used as the two-dimensional code scanner.

When a printing error had occurred and the image had not been recorded properly, the control device stopped the image recording by the laser marker to prevent the image from being recorded on the container 2. As a result, the only wasteful effort made was to recall the container 1 and record one piece of recording information again (see Table 2).

TABLE 2

|   | A | B | C | D |
|---|---|---|---|---|
| Ex. 5 | 0.00–0.51 | 350 | a | 0 |
| Comp. Ex. 5 | 0.63–1.14 | 350 | b | — |
| Comp. Ex. 6 | 0.63–1.14 | 600 | a | 1 |

A: the recording start time and recording end time (s) of the two-dimensional code
B: the distance (mm) in the conveying direction between the set position of the two-dimensional code scanner and the set position of the laser marker
C: the readability of the two-dimensional code when the image was recorded properly
a—readable b—unreadable
D: the number of containers to he recalled when a printing error occurred, except the container (container 1) on which the printing error actually occurred Comparative Example 5

Figure 12A:
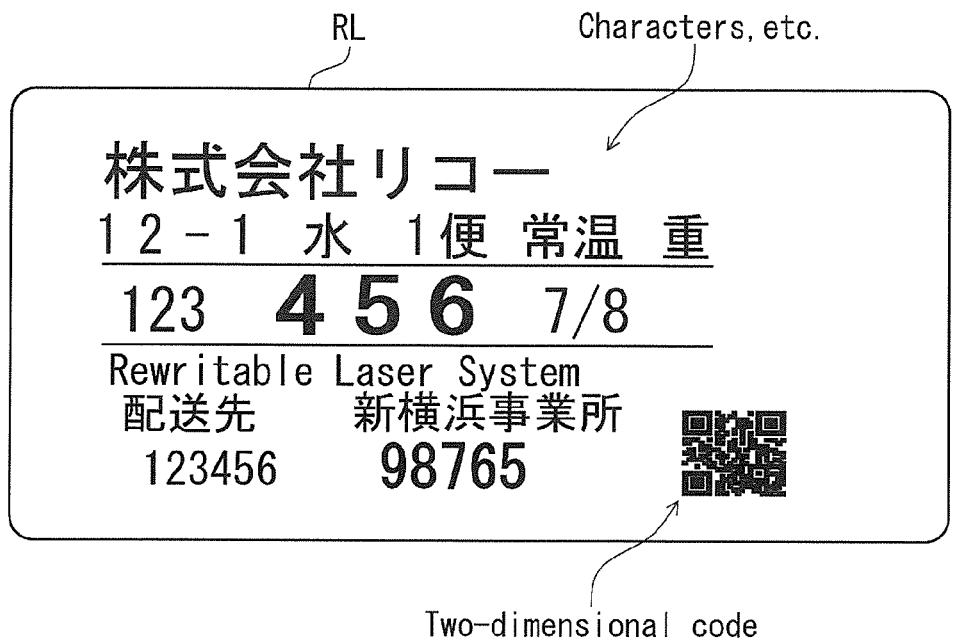
FIG. 12A is a diagram showing an image including a two-dimensional code recorded on a RL.
Figure 12B:
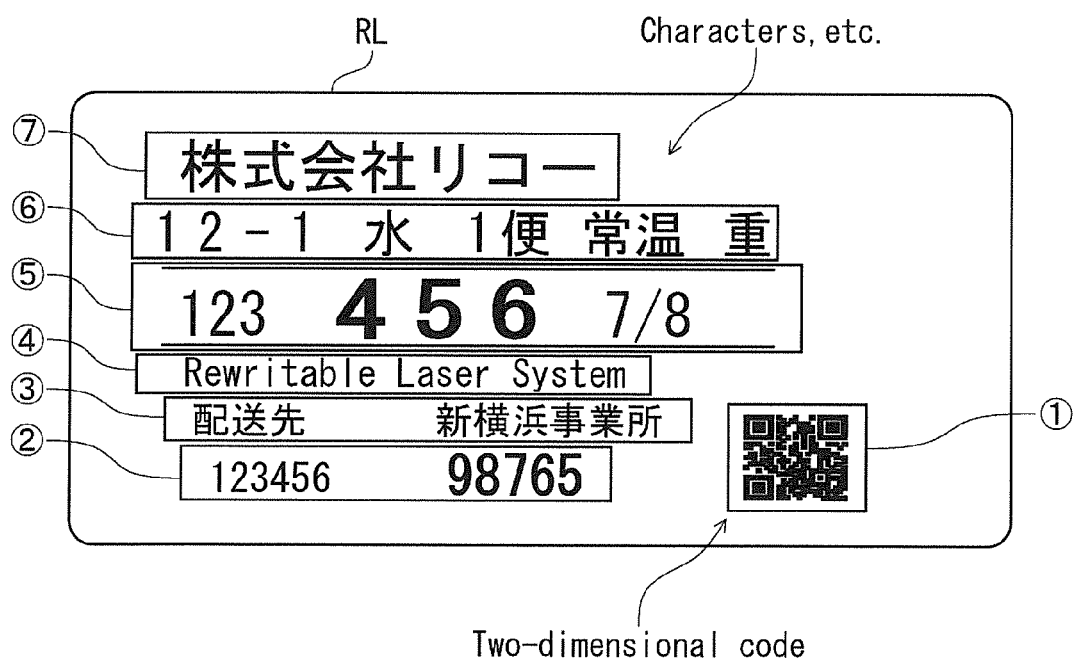
FIG. 12B is a diagram for explaining a recording order of an image including a two-dimensional code recorded on a RL (part 1).
Figure 12C:
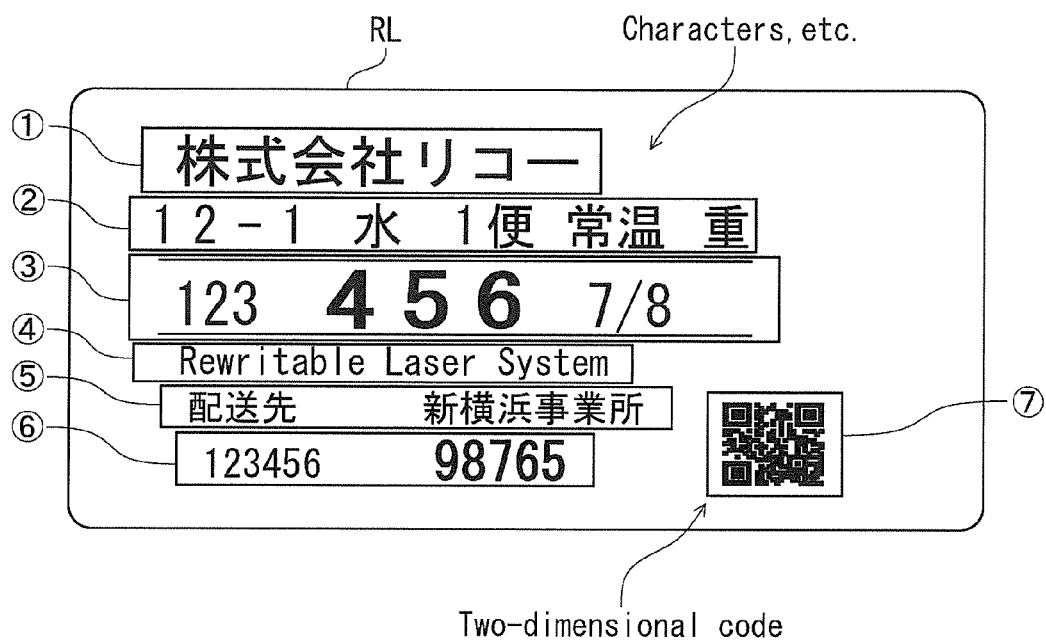
FIG. 12C is a diagram for explaining a recording order of an image including a two-dimensional code recorded on a RL (part 2).

Verification of readability of a two-dimensional code was so performed with the two-dimensional code scanner SR-610 manufactured by Keyence Corporation on the same conditions as Example 5, except that the image shown in FIG. 12A including a two-dimensional code was recorded in the writing order indicated in FIG. 12C so that the two-dimensional code may be recorded within a period of time from 0.63 s to 1.14 s, i.e. within the latter half of the recording time (with a length of 1.14 s). As a result, the two-dimensional code could not be successfully read even when the image had been recorded properly (see Table 2).

Comparative Example 6

Reading (scanning) of a two-dimensional code was performed on the same condition as Comparative Example 5, except that the two-dimensional code scanner was set at a position that was 600 mm downstream from the laser marker in the conveying direction. As a result, the two-dimensional code could be successfully read when the image had been recorded properly. When a printing error had occurred and the image had not been recorded properly, the control device stopped the image recording by the laser marker, but the image had also been recorded on the container 2. As a result, a wasteful effort of recalling the container 1 and the container 2 and recording two pieces of recording information again was made (see Table 2).

Altogether, as compared with Comparative Examples, Examples enabled the barcode scanner (or the two-dimensional code scanner) to be set more upstream on the conveying path and could suffice with a shorter conveyor line, which would realize a small-scale conveyor and a small installation space. Further, when a printing error occurred, it was only necessary to recall only the container to which the printing error had actually occurred (i.e., the container 1), which was labor-saving and efficient.

The aspects of the present invention are as follows, for example.

<1> An image recording system for recording an image on a thermally reversible recording medium held by a conveyed article conveyed on a predetermined conveying path in a predetermined conveying direction, including:
a recording device provided on at least one side of the conveying path in a direction perpendicular to the conveying direction and configured to record an image on the thermally reversible recording medium of the conveyed article conveyed to a position facing the recording device by heating the thermally reversible recording medium,
wherein the image includes a scan image to be read by a reading device when the conveyed article is conveyed downstream in the conveying direction from the position facing the recording device, and
wherein the recording device records the scan image on the thermally reversible recording medium within a former half of a recording time of the image.

<2> The image recording system according to <1>,
wherein the scan image is read by the reading device after the density of the scan image recorded on the thermally reversible recording medium has become a density readable by the reading device.

<3> The image recording system according to <2>,
wherein the density of the scan image becomes a density readable by the reading device when a predetermined time passes from when recording of the scan image on the thermally reversible recording medium is completed, and
wherein a time from when recording of the image is completed until when reading of the scan image is started is shorter than the predetermined time.

<4> The image recording system according to <3>,
wherein the predetermined time is 2 seconds or shorter.
<5> The image recording system according to any one of <1> to <4>,
wherein the scan image includes a barcode.
<6> The image recording system according to any one of <1> to <5>,
wherein the scan image includes a two-dimensional code.
<7> The image recording system according to any one of <1> to <6>,
wherein the recording device records the image by irradiating the thermally reversible recording medium with laser light.
<8> The image recording system according to any one of <1> to <7>,
wherein the thermally reversible recording medium includes: a support member; a photothermal conversion material provided on the support member and configured to absorb light of a specific wavelength and convert it to heat; and a thermally reversible recording layer containing a leuco dye and a reversible developer and configured to change its color tone reversibly depending on temperature.
<9> The image recording system according to <8>,
wherein the photothermal conversion material has an absorption peak in a near-infrared range.
<10> The image recording system according to <8> or <9>,
wherein the photothermal conversion material is a metal boride or a metal oxide.
<11> The image recording system according to <8> or <9>,
wherein the photothermal conversion material is a phthalocyanine-based compound.
<12> An image recording method for recording an image on
a thermally reversible recording medium held by a conveyed article conveyed along a predetermined conveying path,
the image including a scan image to be read by a reading device,
the method including:
recording an image on the thermally reversible recording medium of the conveyed article conveyed to a predetermined position on the conveying path; and
after the recording, conveying the conveyed article downstream from the predetermined position on the conveying path and checking readability of the scan image,
wherein in the recording, the scan image is recorded on the thermally reversible recording medium within a former half of a recording time of the image.
<13> The image recording method according to <12>,
wherein the checking of readability is performed after the density of the scan image recorded on the thermally reversible recording medium has become a density readable by the reading device.
<14> The image recording method according to <13>,
wherein the density of the scan image becomes a density readable by the reading device when a predetermined time passes from when recording of the scan image on the thermally reversible recording medium is completed, and
wherein a time from when recording of the image is completed until when reading of the scan image is started is shorter than the predetermined time.

This application claims priority to Japanese application No. 2012-269074, filed on Dec. 10, 2012 and incorporated herein by reference, and Japanese application No. 2013-215912 filed on Oct. 17, 2013 and incorporated herein by reference.

What is claimed is:

1. An image recording system, comprising:
a recording device provided on at least one side of a predetermined conveying path in a direction perpendicular to a predetermined conveying direction of the conveying path and configured to record an image including a first image and a second image that is distinct from the first image, on a thermally reversible recording medium disposed on a conveyed article conveyed on the conveying path in the conveying direction to a position facing the recording device, by heating the thermally reversible recording medium,
wherein the first image is a scan image to be read by a reading device when the conveyed article is conveyed downstream in the conveying direction from the position facing the recording device,
wherein the reading device electrically reads image information formed by light reflection, to convert optical information to electrical information, and
wherein the recording device records the first image on the thermally reversible recording medium to completion before forming the second image that is distinct from the first image.

2. The image recording system according to claim 1, wherein the scan image is read by the reading device after a density of the scan image recorded on the thermally reversible recording medium has become a density readable by the reading device.

3. The image recording system according to claim 2,
wherein the density of the scan image becomes a density readable by the reading device when a predetermined time passes from when recording of the scan image on the thermally reversible recording medium is completed, and
wherein a time from when recording of the image is completed until when reading of the scan image is started is shorter than the predetermined time.

4. The image recording system according to claim 3,
wherein the predetermined time is 2 seconds or shorter.

5. The image recording system according to claim 1,
wherein the scan image includes a barcode.

6. The image recording system according to claim 1,
wherein the scan image includes a two-dimensional code.

7. The image recording system according to claim 1,
wherein the recording device records the image by irradiating the thermally reversible recording medium with laser light.

8. The image recording system according to claim 1,
wherein the thermally reversible recording medium comprises: a support member; a photothermal conversion material provided on the support member and configured to absorb light of a specific wavelength and convert it to heat; and a thermally reversible recording layer that comprises a leuco dye and a reversible developer and that is configured to change its color tone reversibly depending on temperature.

9. The image recording system according to claim 8, wherein the photothermal conversion material has an absorption peak in a near-infrared range.

10. The image recording system according to claim 8,
wherein the photothermal conversion material is a metal boride or a metal oxide.

11. The image recording system according to claim 8,
wherein the photothermal conversion material is a phthalocyanine-based compound.

12. An image recording method, comprising:
(a) recording, by a recording device, an image including a first image and a second image that is distinct from the first image, on a thermally reversible recording medium disposed on a conveyed article conveyed to a predetermined position on a predetermined conveying path, by heating the thermally reversible recording medium, the first image being a scan image to be read by a reading device that electrically reads image information formed by light reflection, to convert optical information to electrical information; and
(b) after the recording, conveying the conveyed article downstream from the predetermined position on the conveying path, and checking readability of the scan image,
wherein the recording device records the first image in (a) on the thermally reversible recording medium to completion before forming the second image that is distinct from the first image.

13. The image recording method according to claim 12, wherein the checking of readability is performed after a density of the scan image recorded on the thermally reversible recording medium has become a density readable by the reading device.

14. The image recording method according to claim 13,
wherein the density of the scan image becomes a density readable by the reading device when a predetermined time passes from when recording of the scan image on the thermally reversible recording medium is completed, and
wherein a time from when recording of the image is completed until when reading of the scan image is started is shorter than the predetermined time.

* * * * *